United States Patent [19]
Osborne

[11] Patent Number: 6,078,733
[45] Date of Patent: Jun. 20, 2000

[54] NETWORK INTERFACE HAVING SUPPORT FOR MESSAGE PROCESSING AND AN INTERFACE TO A MESSAGE COPROCESSOR

[75] Inventor: Randy B. Osborne, Newton, Mass.

[73] Assignee: Mitsubishi Electric Information Technolgy Center America, Inc. (ITA), Cambridge, Mass.

[21] Appl. No.: 08/614,833

[22] Filed: Mar. 8, 1996

[51] Int. Cl.[7] .............................. G06F 13/12; G06F 15/16
[52] U.S. Cl. ................................. 395/200.8; 395/200.42; 395/200.46; 395/200.64
[58] Field of Search ........................ 395/200.07, 200.08, 395/200.09, 200.12, 200.15, 200.2, 200.42, 200.43, 200.46, 200.47, 200.57, 200.58, 200.64, 200.66, 200.67, 200.68, 200.8, 800.25, 800.26, 800.27, 800.28, 200, 800, 827, 840–842, 876

[56] References Cited

U.S. PATENT DOCUMENTS

| | | | |
|---|---|---|---|
| 5,247,626 | 9/1993 | Firoozmand | 395/200.42 |
| 5,299,313 | 3/1994 | Petersen et al. | 395/200.64 |
| 5,560,029 | 9/1996 | Papadopoulos et al. | 395/800.25 |
| 5,613,136 | 3/1997 | Casavant et al. | 395/800.28 |
| 5,664,116 | 9/1997 | Gaytan et al. | 395/200.64 |
| 5,682,553 | 10/1997 | Osborne | 395/876 |
| 5,696,936 | 12/1997 | Church et al. | 395/200.8 |
| 5,751,951 | 5/1998 | Osborne et al. | 395/200.8 |
| 5,790,804 | 8/1998 | Osborne | 395/200.75 |

Primary Examiner—Zarni Maung
Assistant Examiner—Bharat Barot
Attorney, Agent, or Firm—Dirk Brinkman

[57] ABSTRACT

A network interface for a connection-based communication network has support for message processing, including an interface for communication with an optional message coprocessor that performs a variety of message processing operations. Message processing is low level processing of messages between the host computer and the network. Such processing is performed on transmission in response to control information provided by the host and is performed on reception in response to control information included in incoming messages. Message processing includes low latency remote read and remote write operations, message filtering, and message demultiplexing. Such a network interface provides support for a variety of message processing operations using the coprocessor, while the complexity and cost of the network interface due to this support is minimal. The network interface provides control information for a message to the message coprocessor. The control information indicates an operation to be performed by the message coprocessor, and possibly operands. The message coprocessor responds with one of a small set of commands to be executed by the network interface. The command from the message coprocessor may include additional data, such as a location in memory in which data should be deposited at the host or at a remote destination. Using this kind of interface, the control information provided to the message coprocessor can be completely arbitrary, limited only by the capabilities of the message coprocessor. Since the message coprocessor can be arbitrarily selected so long as it conforms to the protocol used by the network interface, experimentation with new communication protocols in connection with the network interface is simplified.

26 Claims, 18 Drawing Sheets

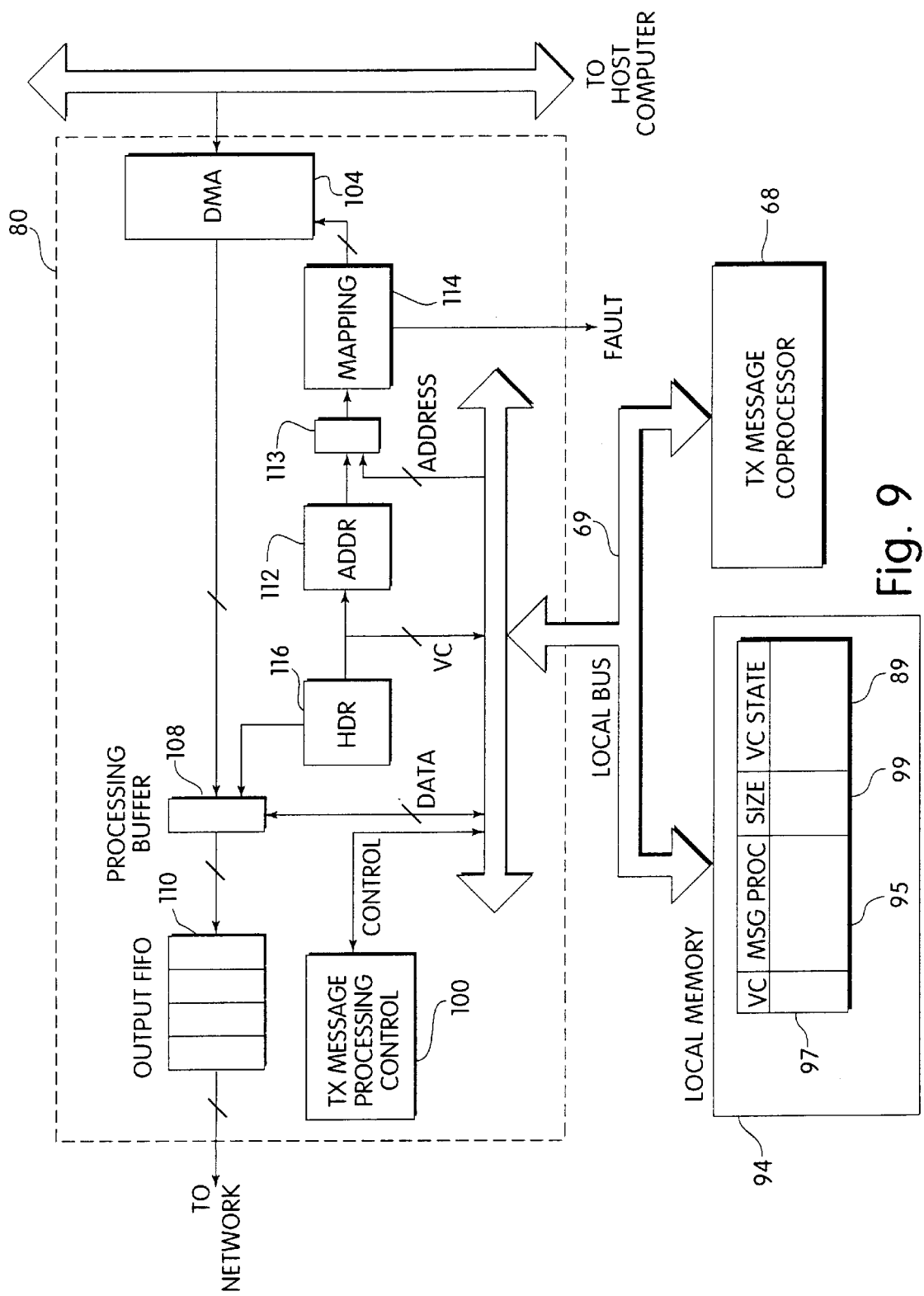

NETWORK INTERFACE HAVING SUPPORT FOR MESSAGE PROCESSING AND AN INTERFACE TO A MESSAGE COPROCESSOR

FIELD OF THE INVENTION

This invention is related to network interfaces, particularly for connection-based networks such as asynchronous transfer mode networks. More particularly, the invention is related to the provision of support for message processing in a network interface, including low latency communication, message filtering, and message demultiplexing.

BACKGROUND OF THE INVENTION

In digital communications, and in particular in connection-based communication systems such as asynchronous transfer mode (ATM) networks, a number of computers are interconnected to a network and communicate messages or streams of information in sequences of units, called packets or frames (used interchangeably herein). In asynchronous transfer mode networks, packets are a combination of small units called cells. A packet sent to a particular computer is received by the computer through a network interface which connects the computer to the network. Similarly, a computer injects packets into the network via the network interface. The task of the network interface is to process packets efficiently for both reception and transmission.

In this application, the term "message" signifies the semantic content of a packet, i.e., what the packet data represents.

In most current computer systems, a packet is received by capturing the packet first in a buffer in the network interface. At an appropriate time, the host computer is notified of the arrival of the packet. With some network interfaces, the host computer then copies the packet from the network interface into a free buffer in its host memory and performs any processing that is required by the packet. More recent network interfaces have a direct memory access (DMA) mechanism which allows the network interface to place the data into a free buffer in the host memory. Similarly, when a message is transmitted by the host computer, it informs the network interface of the location of the data in the host memory and the desired destination. The network interface copies appropriate size chunks of the data from the host memory into local memory of the network interface and then forms packets with that data for transmission to the destination. More recent network interfaces allow for direct memory access to the host memory to obtain data for outgoing packets.

The process of receiving and transmitting messages comprised of packets involves computer processing overhead which is chiefly due to operating system interaction and message copying. Operating system interaction typically occurs because application programs on the host computer do not interact directly with the network interface, but rather indirectly via the host operating system. There are four major types of interactions. First is handling notification, typically via an interrupt when packets arrive and/or when the number of unprocessed packets in the receive queue exceeds a given threshold. Second is application initiated transfer of data either to a transmit queue, to send a packet, or from the receive queue in response to notification from the network interface. Third is the translation of virtual memory addresses used by the application program into physical addresses used by the network interface to access host memory directly. In a state of the art system, on the transmit side this interaction occurs when the operating system informs the network interface of the data to be sent. On the receive side, this same overhead occurs when the operating system informs the network interface of the location, of a free buffer in which a received message should be placed. Fourth is general housekeeping functions, such as keeping the free buffer queue full, that are not in a critical path. Operating system calls and handling interrupts are typically expensive. Such operating system interaction both consumes host processing cycles, reducing the number of cycles available to application programs, and adds a delay in sending and receiving messages.

Message copying overhead generally occurs because the buffer(s) used by the operating system in which a received message is stored, is chosen from a global pool of available free buffers in the operating system, such that there is no fixed assignment of free buffers to connections. As a result, the location of the free buffer is not guaranteed to be the final location in the host memory in which the message data is desired by the application program. Therefore, the operating system copies the data from the free buffer to the desired final location. Thus, message copying also consumes host processing cycles, reducing the number of cycles available to application programs, and adds a delay in receiving messages.

Operating system interaction is reduced by using a network interface that permits an application program to access directly the network interface. However, to ensure appropriate protection, there is a mechanism which translates virtual addresses used by application programs to physical addresses used by the network interface. Such a network interface is disclosed, for example, in "Experiences with a High-Speed Network Adaptor: A Software Perspective," by Peter Druschel et al., published in the *Proceedings of ACM SigComm '94*, September 1994. This paper describes a system in which virtual addresses are used in network interface which includes a mapping engine to generate physical addresses from the virtual addresses. In such a system, the operating system does not need to perform the translation, but provides the network interface with a virtual address.

Message copying overhead can be reduced by providing a mechanism which transfers data directly from the network interface to the application program address space, bypassing the host processor. Such a system is disclosed in U.S. patent application Ser. No. 08/226,541 by Randy B. Osborne, filed Apr. 12, 1994, now abandoned. In such a system, messages communicated in the network include an area of destination control information, which identifies an operation to be performed by the network interface and possibly some operands to be used in performing the operation. A mechanism in the network interface examines a received message and performs the operation indicated by the destination control information without interaction with the host processor. For example, data in a message may be deposited directly into host memory at a location determined by the network interface to eliminate copying by the host computer.

Direct deposit of message data in host memory is just one kind of message processing that can be performed by a network interface using such control information. There are several other kinds of operations which involve low level processing of messages between retrieving a message from the host and injecting it in the network and receiving a message from the network and storing it to the host.

One kind of message processing is message filtering. With an appropriate message format, the receive side can filter out undesired messages before such messages arrive at the host and consume host resources, particularly host processor time. One possible use for such filtering is to increase the efficiency of ATM Forum-style LAN Emulation (LANE) implementations. Such implementations broadcast messages to find unknown destinations and echo messages sent to a LANE server. Both of these operations result in hosts receiving unwanted messages. Usually, a host computer consumes resources to process such messages only to immediately discard them. With the present invention, a message processor can inspect the control information in the beginning of a received message and discard the message without ever involving the host computer.

Another kind of message processing is fast and cheap demultiplexing of messages. The beginning of a message could be used as a demultiplexing field to indicate where a message should be sent in the host. For example, a transmission control protocol (TCP) port address can be extracted from the header of a TCP packet and used to send the packet to a queue appropriate for that port. This demultiplexing by the network interface and message coprocessor can help off-load message demultiplexing from the host.

Message processing also includes remote operations, which belong to a class of protocols in which messages carry information describing the action to take with the message body at the destination. In traditional protocols, the host computer at the destination cannot do any processing of a message until it receives all of the data it requires. As described above, this requirement introduces extra overhead of copying the data, and more significantly for small messages, notification overhead and interruption of the host processor main line activity for message processing. Some industrial control systems already use remote operations for implementing "cyclic" memory, known more generally as reflective memory. Message processing support in a network interface in accordance with the present invention makes implementation of cyclic memory easier and more efficient.

Another kind of message processing operation is scatter direct memory access (DMA). Two types of scatter DMA are particularly useful: implicit scatter, where the scattering sizes are predefined, and explicit scatter, where the message contains scatter destination address bundled with the message data. A example of implicit scatter is separating the protocol header from message data and sending the header to one buffer and the data to another buffer, where the buffers can be in arbitrary locations. This technique can be used in TCP/IP processing. For explicit scatter DMA, low level processing at the destination can unbundle the data and addresses and send the data to the appropriate addresses.

Providing support in a network interface for such message processing, however, adds complexity and therefore cost to the network interface. Since low level message processing in network interfaces currently involves research in non-standard communication protocols, this added cost generally outweighs the benefits in commercial applications. Accordingly, most commercially-available network interfaces do not provide such support.

SUMMARY OF THE INVENTION

The invention reduces the complexity of support for message processing in a network interface for a connection-based communication network by providing a simple interface to connect the network interface with an arbitrary message coprocessor. In one embodiment, the network interface is a simple integrated circuit with both a simple interface to an external message coprocessor and means to extract control information from messages, send the control information to the coprocessor, and respond to a small set of commands issued by the coprocessor. In this way the network interface incurs minimal overhead for message processing while still retaining all the generality an external coprocessor can provide.

In a network interface in accordance with the invention, on the receive side, destination control information in a message is extracted by the network interface and sent to the message coprocessor. The message coprocessor is programmed to perform, in response to the destination control information, a variety of message processing operations, including operations for low latency communication, message filtering, or other forms of message processing by the network interface. The message coprocessor returns one of a simple set of commands that the network interface understands. By providing only a small set of commands to be sent to the network interface and by allowing destination control information to define a variety of message processing operations, a very flexible system is obtained.

On the transmit side, the network interface reads source control information generated by the host computer and sends it to the message processor. The message coprocessor performs operations, in response to the source control information, for generating the destination control information for an outgoing message that will be processed by the network interface at its destination. The message coprocessor returns one of a small set of commands to the network interface which processes the command and inserts the destination control information in the outgoing message.

To support such an interface for message processing, the network interface includes mechanisms for inserting destination control information into transmitted messages and extracting destination control information from received messages. The network interface also has a simple connection to the message coprocessor. The message coprocessor may reside on a local bus used by the network interface. This local bus may be a memory bus used by the network interface to store a table of information about current connections or virtual channels. In this case, the coprocessor may be mapped into the network interface memory space and accessed like a memory.

The combination of functions provided in this system allows for a variety of remote operations to be performed, including low latency communication (remote reads and writes), efficient filtering of messages and fast, inexpensive demultiplexing. The use of an arbitrary message coprocessor provides a flexible way to handle received and transmitted messages, by allowing the control information to define any command which the coprocessor can perform.

The ability to perform low latency remote operations with a reply is particularly significant. Remote operations with reply are intrinsically difficult to support since the received message must not only be decoded like a remote write operation, but a send operation must be initiated to generate the reply. The network interface handles a remote read the same way as a remote write: the receive side writes a specified amount of the message data to the message coprocessor and then reads a command. Normally this command is performed by the receive side. However, if the command is "send-reply", the network interface invokes the same mechanism used by the transmit side message processing to prepend some control information to the data accessed directly via direct memory access (DMA) from a host memory location. A small communication path, or message queue, is provided between the transmit and receive sides of the network interface to support such remote reads. Such a system allows remote reads to occur without intervention of the host processor.

Accordingly, one aspect of the invention is a receive side of a network interface for connecting a host computer to a network, wherein the network connects the host computer to a plurality of computers. The receive side of the network interface includes a mechanism for extracting control information from a message received from one of the plurality of computers over a connection. This extracted control information is communicated to a message coprocessor connected to the network interface. After communication of the extracted control information to the message coprocessor, the receive side receives and executes a command from the message processor to perform an operation on the received message.

Another aspect of the invention is a transmit side of a network interface for connecting a host computer to a network, wherein the network connects the host computer to a plurality of computers. The transmit side of the network interface includes a mechanism for receiving source control information from a host computer and mechanism for communicating the source control information to a message coprocessor connected to the network interface. The transmit side also includes a mechanism, operative after communication of source control information to the message coprocessor, for receiving and executing a command from the message coprocessor to obtain destination control information. The destination control information is then inserted in a message to be transmitted to one of the plurality of computers over a connection.

Another aspect of the invention is a network interface connected to a host computer, for transmitting and receiving messages to and from a network connecting the host computer to a plurality of computers, wherein a message contains control information and a header indicating a communication channel. The network interface includes controllers for the transmit and receive sides. On the transmit side, the controller receives source control information from the host. The controller interfaces with a transmit side message coprocessor to send the source control information to the message coprocessor and receives one or more commands from a small set of commands from the message coprocessor. In response to the commands from the message coprocessor, the controller inserts destination control information into outgoing messages. On the receive side, the controller extracts destination control information from received messages and sends the destination control information to a receive side message coprocessor. The message coprocessor returns one or more commands from a small set of commands. The controller, in response to the received command, processes the received messages accordingly.

In these various aspects of the invention, the interface between the network interface and the message coprocessor may be a simple memory-mapped interface.

BRIEF DESCRIPTION OF THE DRAWINGS

These and other features of the Subject Invention will be understood better in view of the following Detailed Description taken in conjunction with the Drawings in which:

FIG. 9 is a block diagram of a transmit side of a network interface with message processing support in accordance with this invention;

DETAILED DESCRIPTION

Figure 1A:
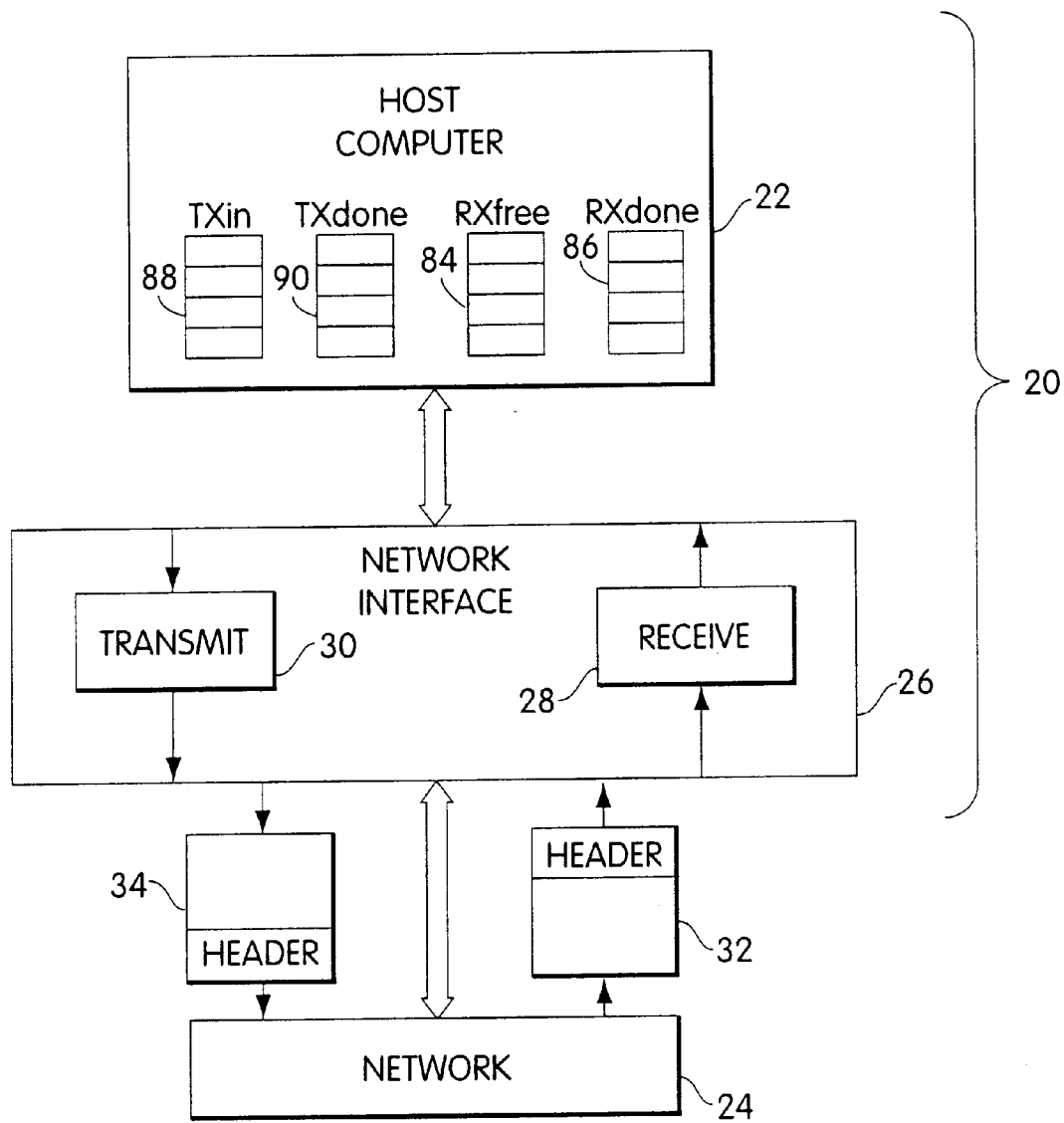
FIG. 1A is a block diagram of a typical computer system with a network interface.

Referring now to FIG. 1A, a typical computer system 20 includes a host computer 22 connected to a network 24 via a network interface 26. The network interface 26 includes a receive side 28 and a transmit side 30 which handle, respectively, transmission and receipt of messages 32, 34. State-of-the-art implementations of such systems generally work as follows.

To assist in transmitting and receiving messages, the host computer 22 maintains four queues, two for each of the transmit and receive sides of communication. On the transmit side, a transmit queue 88 (TXin) is a list of messages to be sent to other computers. Each entry in the list is called a frame descriptor and typically indicates the connection or virtual channel on which the message will be sent and an indication of the location of the message data in the host memory. The transmission-complete queue (TXdone) 90 is a listing of similar entries into which entries from the TXin queue are placed after transmission of the corresponding messages is completed. On the receive side 28. a free buffer queue (RXfree) 84 is a list of free buffers in the host that are available for receiving data. The used buffer list (RXdone) 86 indicates those buffers which have most recently been used to store data from received messages.

To transmit messages 34 from the host computer 22 to the network 24, the network interface 26 reads an entry from the TXin queue 88 to obtain the location in host memory of the data to be sent and the destination of the message. The network interface 26 copies appropriate size chunks of the data from the host memory to the network interface and forms the chunks of data into a packet for transmission into the network. In state of the art systems, such copying is typically performed by direct memory access (DMA).

To receive messages 32 from the network, the host computer identifies in advance locations or free buffers in host memory available for storing arriving Messages. The list of currently available free buffers is found in RXfree queue 84. When a packet arrives at the network interface, the network interface selects a free buffer from the RXfree queue 84 and copies the message data into that free buffer in host memory. Additional free buffers are used as necessary. At the end of the message, the network interface notifies the host computer, such as via interrupt. In state-of-the-art systems, the copying of data from the network interface to a free buffer in host memory is performed via direct memory access (DMA), an efficient block transfer initiated by the network interface.

In a system such as shown in FIG. 1A, the process of receiving and transmitting messages involves computer processing overhead which is chiefly due to operating system interaction and message copying. Operating system interaction typically occurs because application programs on the host computer do not interact directly with the network interface, but rather indirectly via the host operating system. This interaction has four facets. First is handling notification, typically via an interrupt when messages arrive and/or when the number of messages in RXdone exceeds a given threshold. Second is application initiated transfer of data either to TXin, to send a message, or from RXdone in response to notification from the network interface. Third is the translation of virtual memory addresses used by the application program into physical addresses used by the network interface to access host memory directly. In a state of the art system, on the transmit side this interaction occurs when the operating system informs the network interface of the data to be sent. On the receive side, this same overhead occurs when the operating system informs the network interface of the location, or free buffer, in which a received message should be placed. Fourth is general housekeeping functions, such as keeping RXfree full, that are not in a critical path. Operation system calls and handling interrupts are typically expensive. Such operating system interaction both consumes host processing cycles, reducing the number of cycles available to application programs, and adds a delay in sending and receiving messages.

Message copying overhead generally occurs because the buffer(s) used by the operating system in which a received message is stored, is chosen from a global pool of available free buffers in the operating system, such that there is no fixed assignment of free buffers to connections. As a result, the location of the free buffer is not guaranteed to be the final location in the host memory in which the message data is desired by the application program. Therefore, the operating system copies the data from the free buffer to the desired final location. Thus, message copying also consumes host processing cycles, reducing the number of cycles available to application programs, and adds a delay in receiving messages.

Figure 1B:
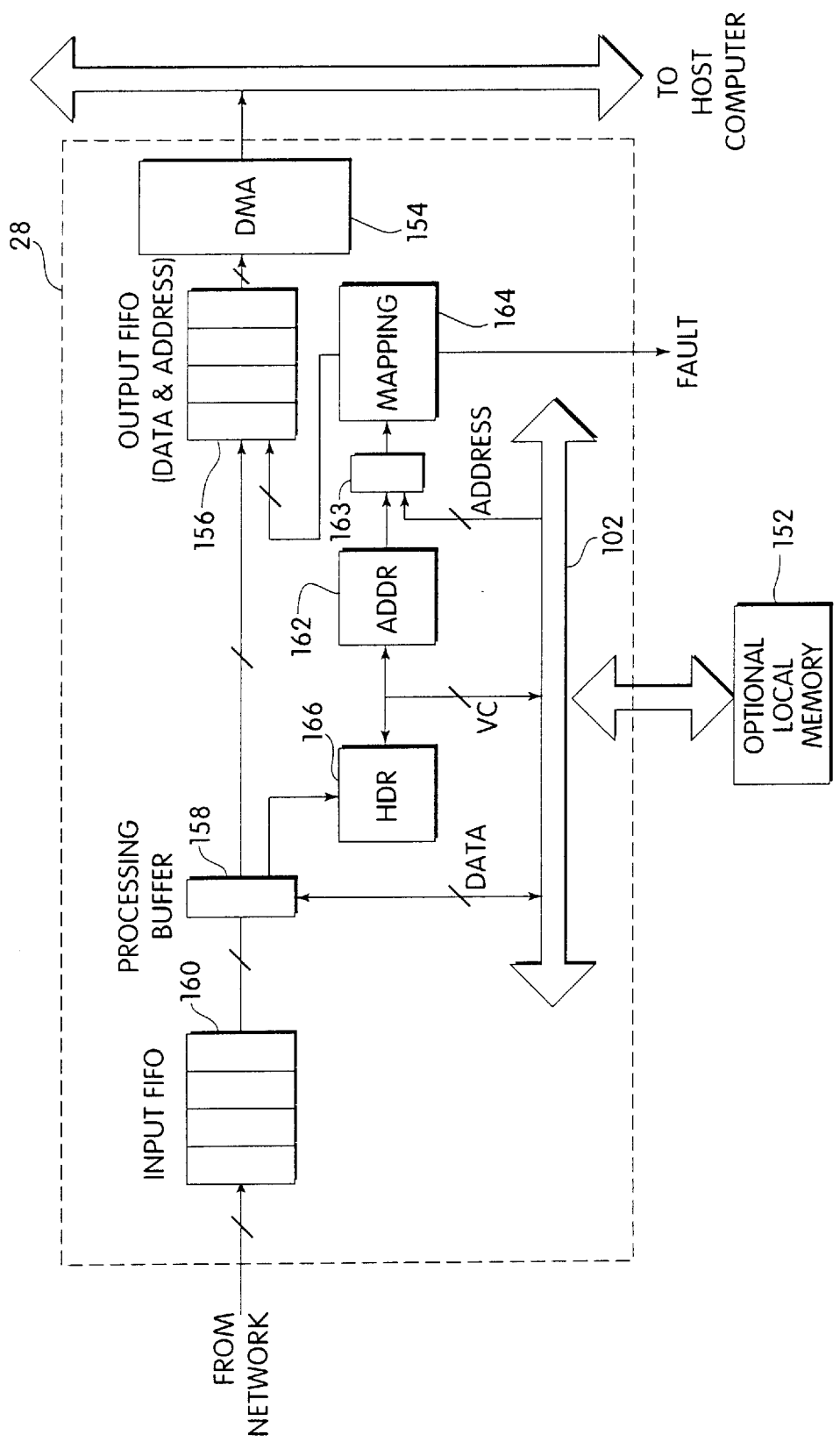
FIG. 1B is a block diagram of a receive side of a network interface which includes a mechanism for mapping virtual addresses.
Figure 1C:
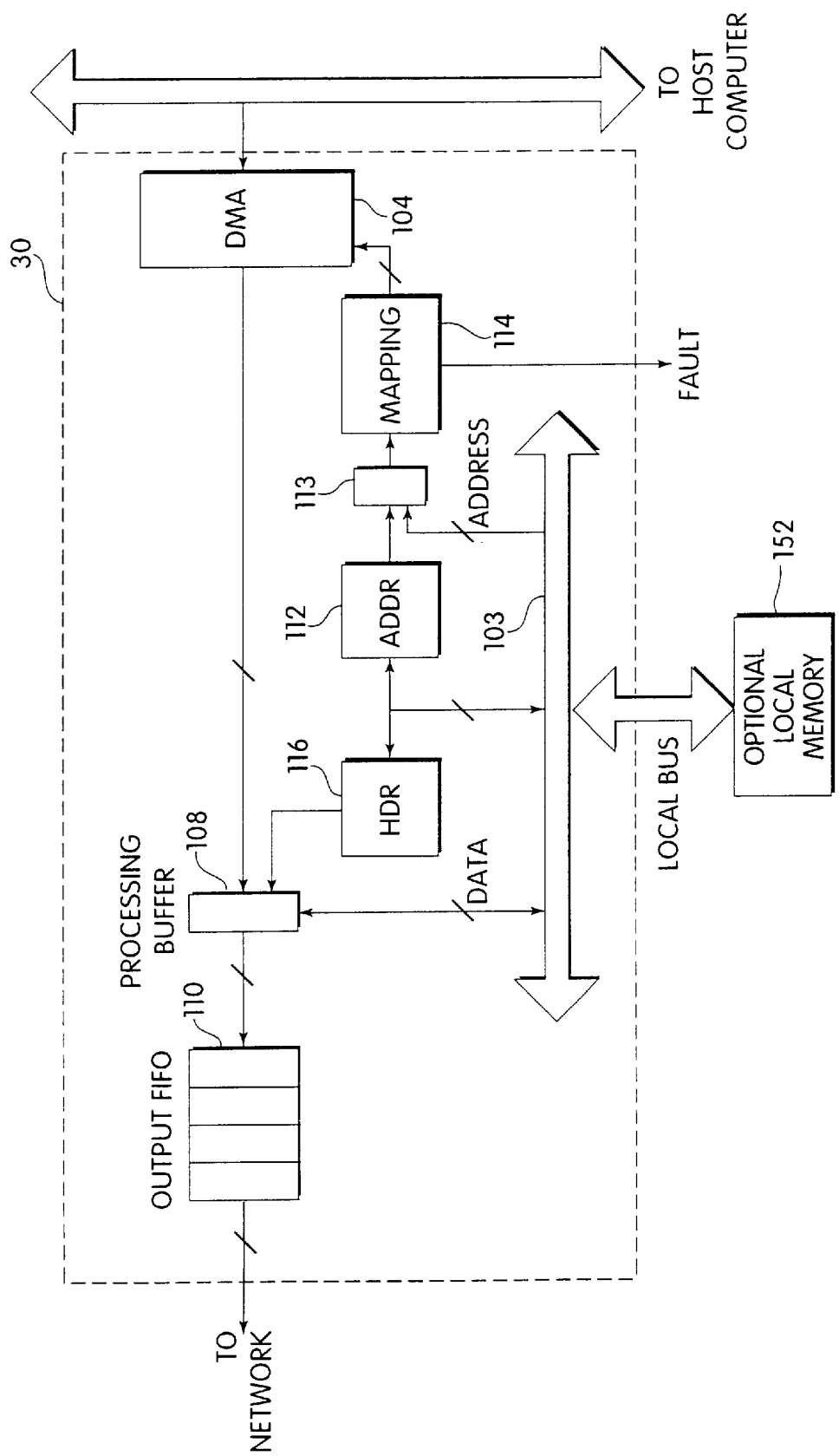
FIG. 1C is a block diagram of a transmit side of a network interface which includes a mechanism for mapping virtual addresses.

Operating system interaction is reduced by using a network interface that permits an application to access directly the network interface. However, to ensure appropriate protection, there is a mechanism which translates virtual addresses used by the application program into physical addresses used by the network interface to access host memory, such as shown in FIGS. 1B and 1C. Such a network interface is disclosed, for example, in "Experiences with a High-Speed Network Adaptor: A Software Perspective," by Peter Druschel et al., published in the *Proceedings of ACM SigComm* '94, September 1994. In such a system, the operating system does not need to perform the translation, but provides the network interface with a virtual address. Though operating system interaction is reduced, the operating system still processes arrival notification.

On the receive side 28 as shown in FIG. 1B, packets are received by an input buffer 160, typically a first-in, first-out memory (FIFO). A processing buffer 158, which may be the first memory location in the input FIFO 160, is connected to both a header processing circuit 166 and an output buffer 156. The output buffer is typically a first-in, first-out memory (FIFO). The header processing circuit strips header information from an incoming packet to determine, among other things, the virtual channel to which the packet is directed. This virtual channel information is used to obtain a virtual address from an optional local memory 152 and address generation circuit 162. An address is provided via multiplexor 163 to mapping circuit 164 which maps the virtual address to a physical address. The data to be written, from processing buffer 158, and the physical address from mapping circuit 164 are input to the output buffer 156. A DMA section 154 processes data in the output buffer 156 to place the data directly in the corresponding location in host memory.

On the transmit side 30, as shown in FIG. 1C, a virtual address is received via local bus 103, for example from a controller (not shown) in the network interface or by generation by the address generation circuit 112 via selector 113. The virtual address is provided to a mapping circuit 114 which determines a physical address used by a DMA circuit 104 to access host memory and copy data into a processing buffer 108. A header processing circuit 116 provides header information to processing buffer 108. The generated packet is then provided to an output FIFO 110 for transmission to the network.

Message copying overhead can be reduced by providing a mechanism which copies data directly from the network interface to the application program address space, bypassing the host processor. Such a system is disclosed in U.S. patent application Ser. No. 08/226,541 by Randy B. Osborne, filed Apr. 12, 1994, now abandoned. In such a system, messages communicated in the network include an area of destination control information, which identifies an operation to be performed by the network interface and possibly some operands to be used in performing the operation. The format of such destination control information is described in more detail below in connection with FIGS. 2B–2E. A mechanism in the network interface examines a received message and performs the operation indicated by the destination control information without interaction with the host processor. For example, data in a message may be deposited directly into host memory at a location determined by the network interface to eliminate copying by the host computer.

Figure 2A:
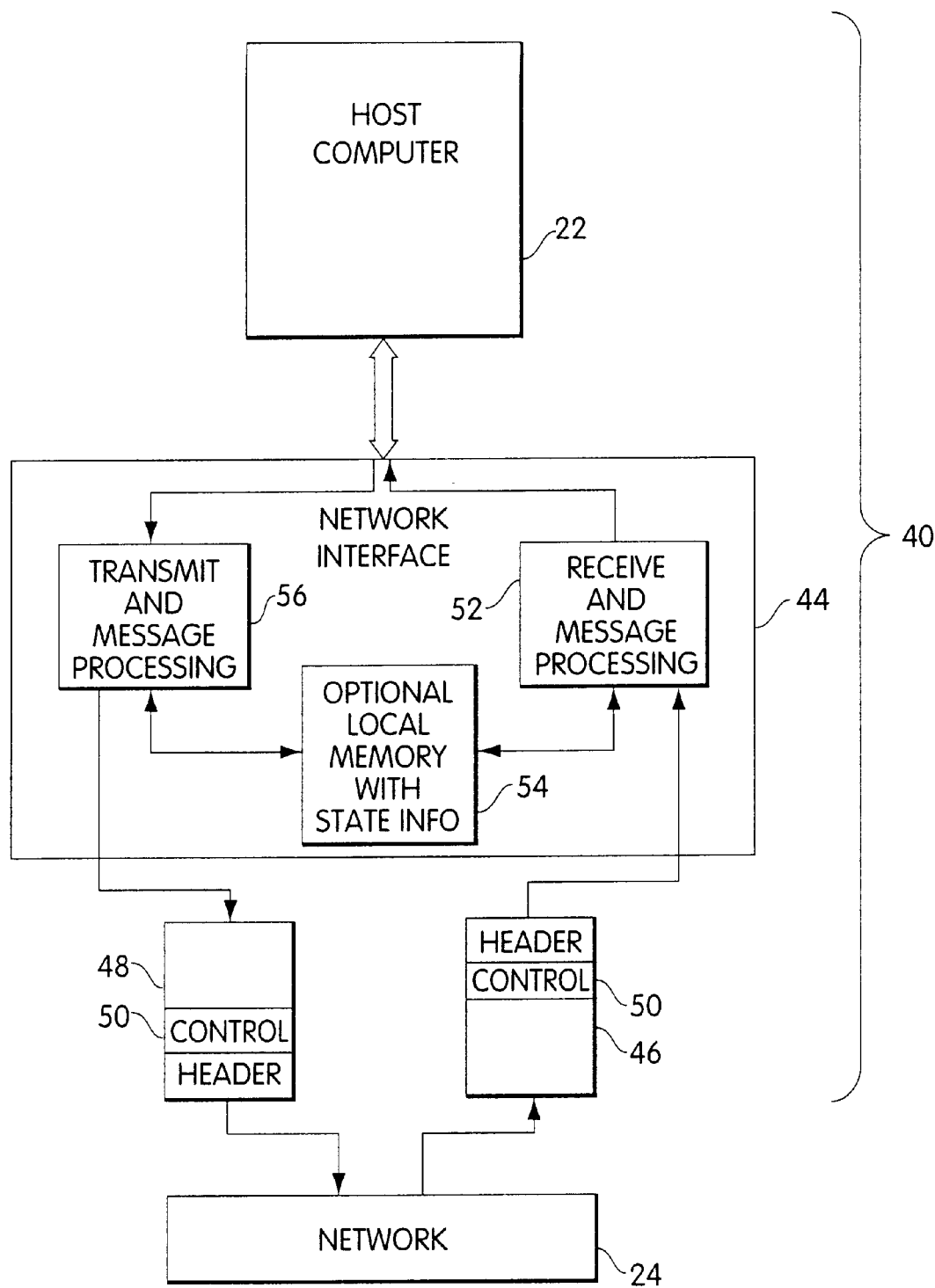
FIG. 2A is a block diagram of a computer system with a host computer and network interface for use in low latency and low overhead communications.
Figure 2B:
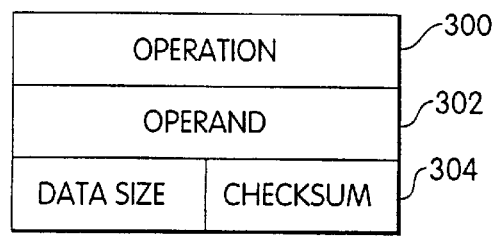
FIG. 2B illustrates data content of a simple form of destination control information.

FIG. 2A shows such a computer system 40 which includes a mechanism for reducing message copying overhead. In FIG. 2A, the computer system includes a computer 22 connected to a network 24 via a network interface 44. In this system, the messages 46 and 48 include destination control information 50 provided by the sender. The receiving network interface processes the destination control information 50 to reduce the communication delay (latency) and the impact of the communication on the receiving host computer 22. In particular, receive side processing 52 uses the destination control information to access state information in the local memory 54 of the network interface. This state information is processed to obtain addresses of specific locations in host memory (not shown) in which data is deposited directly, rather than the location of a next free buffer in RXfree. Similarly, the transmit side 56 reads data directly from the host computer memory (not shown) and appends destination control information obtained using state information from local memory 54 to generate the transmitted message 48.

Figure 2C:
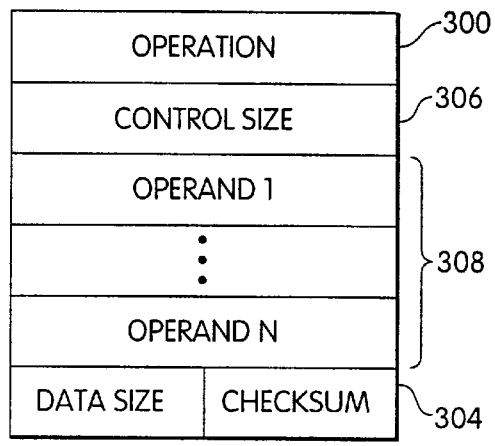
FIG. 2C illustrates data content of a more complex form of destination control information indicating the size of the destination control information.

FIGS. 2B to 2E are schematic diagrams representing the data content of destination control information 50. The simplest kind of destination control information, shown in FIG. 2B, includes an indication 300 of an operation to be performed at the destination, and an indication 302 of an operand used in the operation. The operand may be a refernce to informtation stored in the network interface of the destination or inforoation provided by the source, or both. Data size and checksum information is also provided as indicated at 304. A more complex organization of the destination control information 50, includes an indication 306 (either implicit or explicit) as shown in FIG. 2C, of the size of the destination control information. This format allows for a variable number of operands 308 to be provided.

Figure 2D:
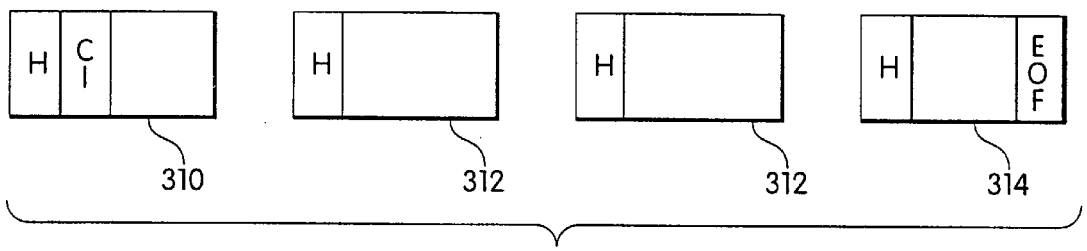
FIG. 2D illustrates a message of a plurality of ATM cells containing destination control information.
Figure 2E:
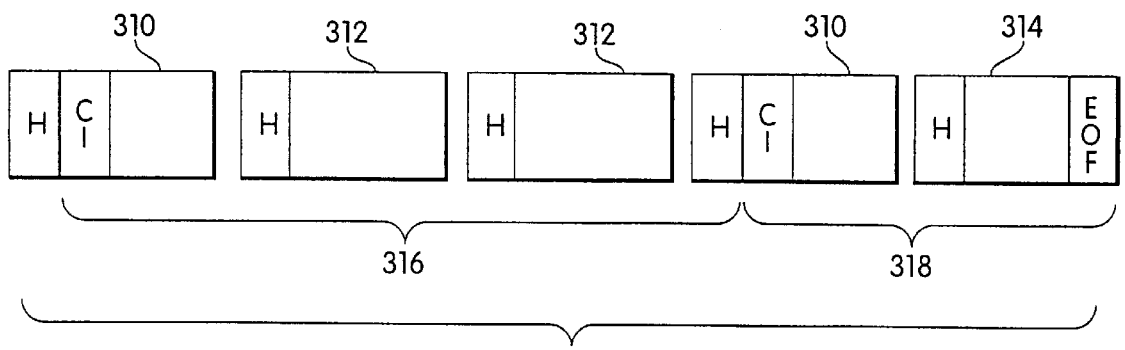
FIG. 2E illustrates a message comprised of a number of control segments.

Such destination control information 50 is generally inserted at the beginning of a message. A message may be comprised of a number of cells if ATM, such as shown in FIG. 2D, in which case, the first cell 310 generally contains the destination control information and remaining cell 312 and a last cell 314 carry data. However, it is also possible to have a message comprised of a number of control segments, as indicated at 316 and 318 as indicated in FIG. 2E. Such a message is called a segmented message. In such a case, each control segment has destination control information 50 inserted at the beginning of the first cell 310 of each control segment.

The present invention reduces complexity of message processing support in a network interface by providing a simple interface to an arbitrary message coprocessor. Destination control information 50 is processed to perform any of an arbitrary set of message processing operations, defined according to the implementation of the message coprocessor. The use of a simple interface to an optional message coprocessor allows a network interface with support for low-level message processing to be manufactured economically. Such a system also allows for experimentation and flexibility in various kinds of message processing operations and their applications, not solely for low latency.

Figure 3:
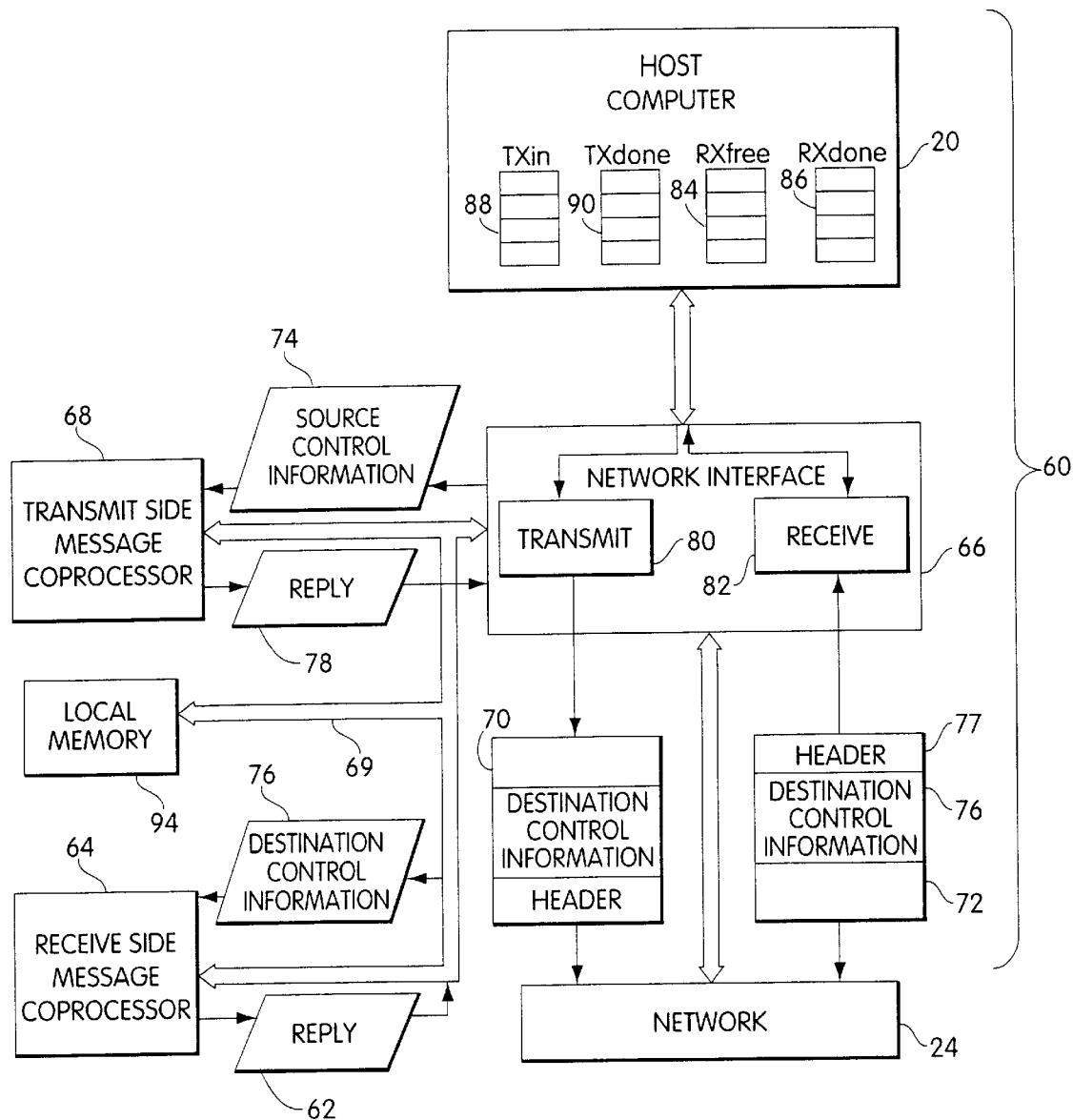
FIG. 3 is a block diagram of a computer system with network interface and message coprocessor in accordance with this invention.

Referring now to FIG. 3, in the invention, a computer system 60 includes a host computer 20 connected to a network 24 via a network interface 66. The network interface may be implemented as an integrated circuit using VLSI or LSI technology. The network 24 connects this computer system 20 to other computer systems (not shown) which are connected to the network in a similar manner. In one embodiment of the invention, the network is a connection-based network such as an asynchronous transfer mode (ATM) network. To support communication processing, the host computer may have ring queues 84, 86, 88 and 90 as in prior systems. In such an embodiment, however, an entry in the transmit side queues 88, 90 may include source control information described below and which, indicates how destination control information is to be obtained.

In the subject invention, the network interface operates as a standard network interface when messages 70, 72 are transmitted or received without any destination control information 76. When a message is to be transmitted or received with destination control information 76, the network interface handles any required processing through optional message coprocessors 68 and 64. Accordingly, the network interface has an interface over a local bus 69 through which it connects to a message coprocessor 68 for transmit side processing and to a message coprocessor 64 for receive side processing.

On the transmit side the network interface sends source control information 74 from the host computer 20 to the transmit side message coprocessor 68 through this interface, which the transmit message coprocessor 68 processes. The source control information indicates to the message coprocessor 68 how to obtain destination control information 76 to be inserted in an outgoing message. A reply 78 indicating a command is returned by the transmit side message coprocessor 68 to the network interface 66. This command indicates how to obtain destination control information 76 to be inserted in the outgoing message.

On the receive side, when a received message includes some destination control information for use in message processing, as indicated at 76, the destination control information is transmitted to a receive side message coprocessor 64 as indicated at 92. The receive side message coprocessor 64 in turn provides a reply 62 to the network interface, which indicates one of a small set of commands indicating the operation to be performed by the network interface 66 on the message.

The simple interface for communicating source control information 74 to the transmit side message coprocessor 68 and for communicating replies 78 from the transmit side message coprocessor 68 to the network interface 66, provides a form of application programming interface between the network interface and the transmit side message coprocessor 68. Similarly, the simple interface for communicating destination control information 76 to the receive side message coprocessor 64, and for communicating replies 62 from the receive side message coprocessor 64 to the network interface 66, provides a form of application programming interface between the network interface and the receive side message coprocessor 64.

The transmit and receive side message coprocessors can be programmed to perform an arbitrary set of message processing functions limited only by the capabilities of the particular message coprocessor involved and the syntax provided for the corresponding control information it processes. Any user can define the syntax of the control information in the operations to be performed by the message coprocessors so long as the message coprocessors always returns a reply indicating one of the small set of commands implemented on the network interface 66. The transmit and receive side message coprocessors need not be separate physical entities as implied by FIG. 3. They may be multiplexed by one physical entity.

In one embodiment of the invention, the network interface is also connected to a local memory 94 over local bus 69. This local memory, for example, may contain tables which are used to maintain state information about the virtual channels currently in use. In this embodiment, whether a received or transmitted message includes destination control information 76 is determined by the connection or virtual channel on which the message is communicated. A "specially-marked" virtual channel, which may be so marked by using a table entry in the local memory 94, can be deemed to have destination control information 76, whereas messages on other connections or virtual channels can be deemed not to have such destination control information 76.

Implementation of such a network interface with support for message processing and an interface to message coprocessors will be described now in more detail in connection with FIGS. 4–12. The receive side message processing support will first be described in more detail in connection with FIGS. 4 and 6A–6B.

Figure 4:
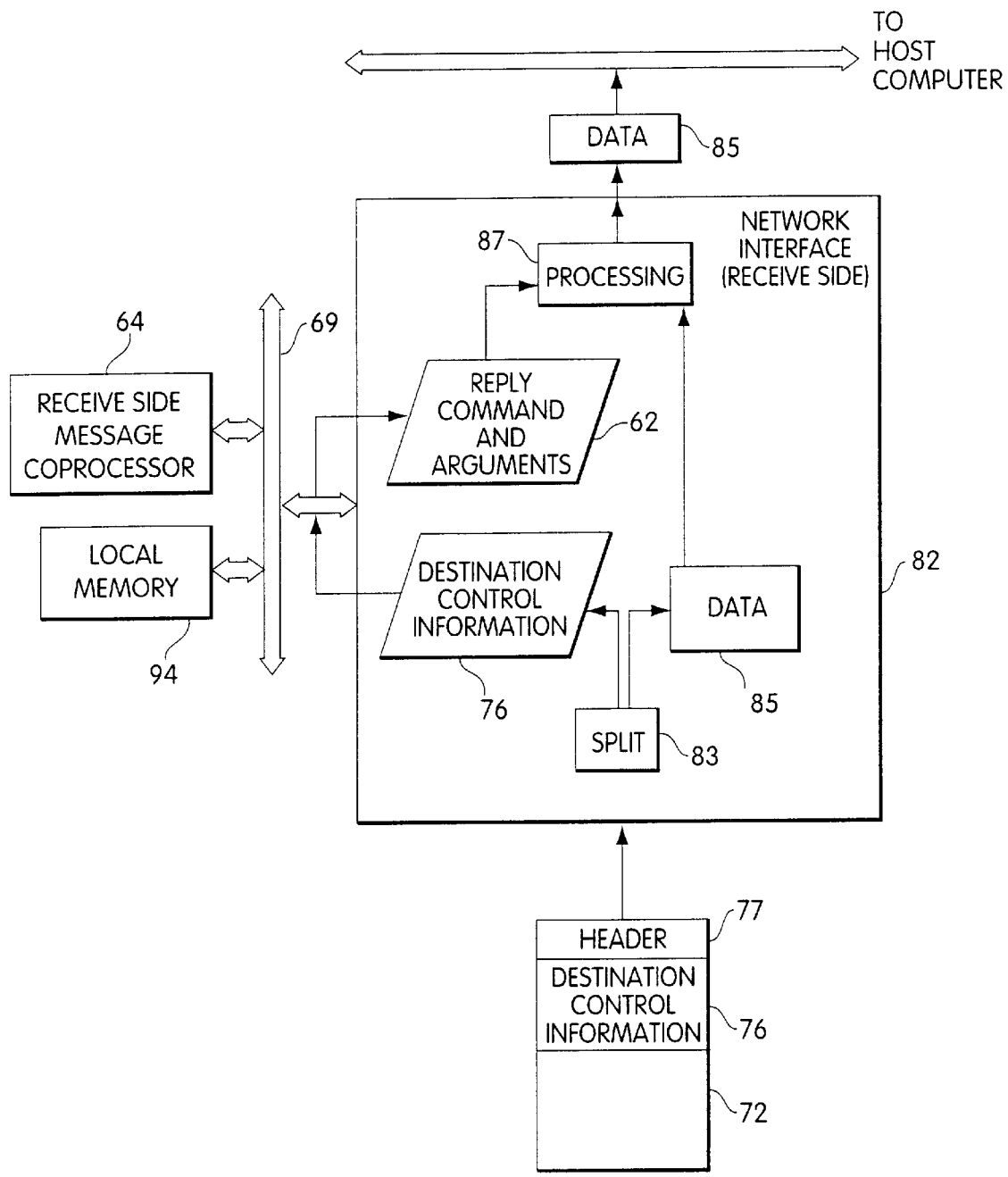
FIG. 4 is a schematic diagram of data flow in a receive side of a network interface with message processing support in accordance with this invention.

Referring now to FIG. 4, the receive side 82 of the network interface is connected to a local bus 69 to which the optional receive side message coprocessor 64 and an optional local memory 94 are connected. The receive side 82 of the network interface generally operates as follows. Messages with destination control information 76 are received and their content is split at 83 into destination control information 76 and data 85. The header 77 is processed to obtain virtual channel (VC) data and other state information. The virtual channel, state and destination control information are provided to the local bus 69 from which they are received by the receive side message coprocessor 64. After completion of processing of the message coprocessor 64, a reply command and arguments 62 are returned by the message processor to the network interface over local bus 69. The network interface has a controller 87 which uses the reply 62 to process the data 85 as so indicated, such as storing the data 85 to a specified location in host memory.

Figure 5:
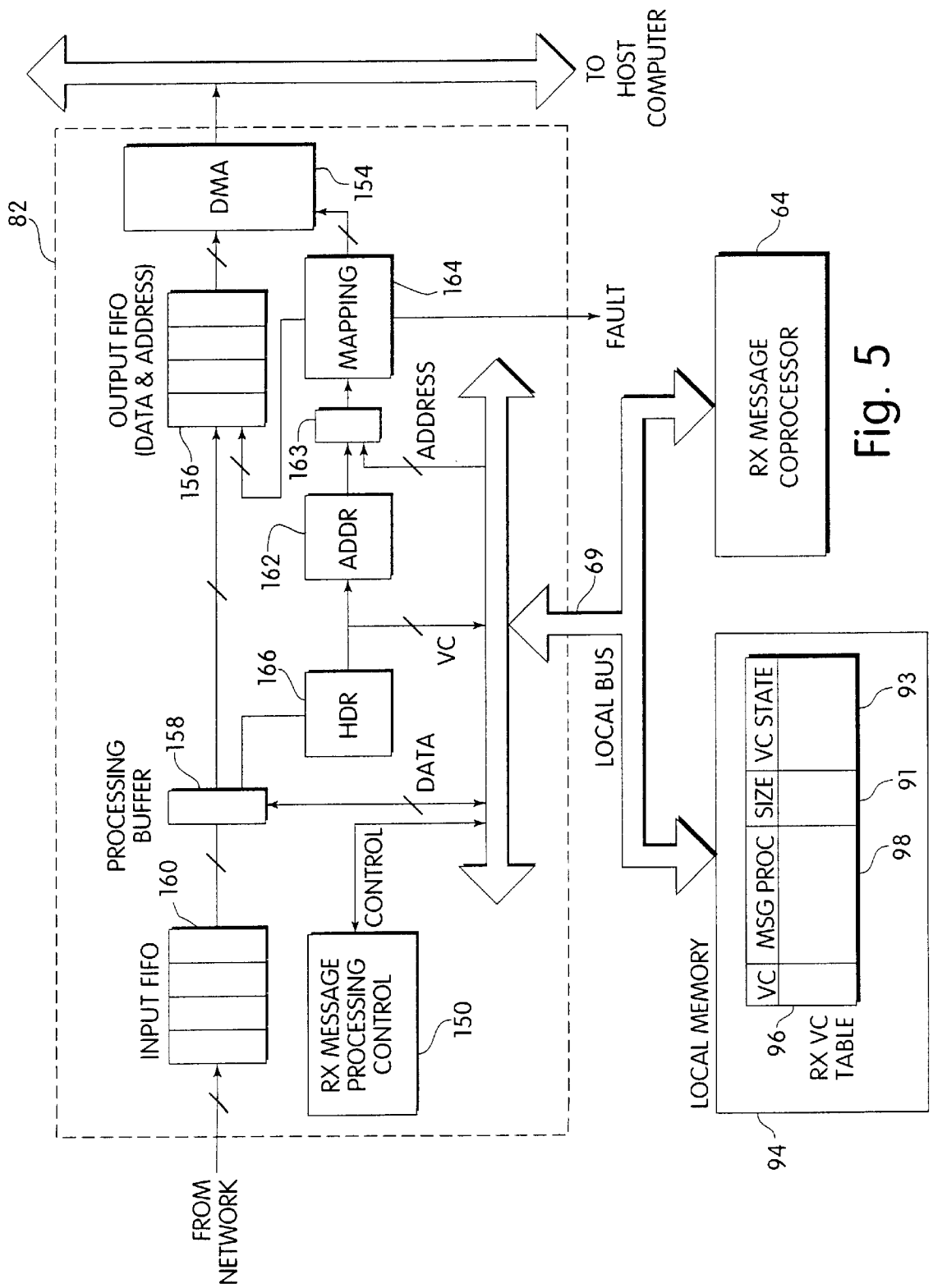
FIG. 5 is a block diagram of a receive side of a network interface with message processing support in accordance with this invention.

FIG. 5 is a more detailed block diagram of elements of the network interface which are relevant to receive side processing. In FIG. 5, the local memory includes a receive side virtual channel table 96 known as a RX VC table. For each entry in the RX VC table, an indication 98 of whether this virtual channel supports message processing operations is provided, and if so, an indication 91 of the initial destination control information size. The table also may contain, per VC other state information such as the physical addresses in which to store remaining cells in the same control segment of a message as indicated 93. The local memory 94, along with a receive side message coprocessor 64, is connected to a receive side (RX) message processing controller 150 via local bus 69. The RX message processing controller 150 uses the RX VC table to determine whether message processing steps are to be taken on an incoming message, and also controls communication with the message coprocessor to cause any such operations to be performed.

Messages are received from the network by an input FIFO 160, which are then transmitted to a processing buffer 158, typically the first memory location of input FIFO 160. The processing buffer 158 holds each cell for processing by the network interface. Destination control information and headers are read from the processing buffer 158. A header processing circuit 166 is provided to read header information from the message to determine the VC information and provide it to a message processing controller 150, which, using information in the RX VC table 96, determines whether message processing operations are to be performed. Processing of the message continues as in a typical network interface if such message processing is not performed. In this respect, the receive side of the network interface may include an address generation circuit 162, multiplexer 163, mapping circuit 164, output FIFO 156 and DMA circuit 154 as discussed above in connection with FIG. 1B.

The general operation of the receive side 82 of the network interface to perform message processing operations will now be described. The receive side 82 of the network interface has the general task of extracting the destination control information 76 from an incoming message 72 to provide it to the receive side message coprocessor 64. If after the steps described above, the network interface finds that the virtual channel is specially marked, and thus, message processing is to be performed, the network interface then determines the size of the destination control information 76 using the RX VC table 96. The message processing controller then accesses this destination control information in the processing buffer 158 and sends it to the receive side message coprocessor 64. The message coprocessor interprets this data as destination control information and performs an appropriate action. The action can be arbitrary and is up to the programmer of the message coprocessor. The network interface then reads back a reply 62 from the message coprocessor 64.

The interface between the network interface and the message coprocessor 68 in one embodiment of the receive side will now be described. On the receive side 82, the network interface communicates with the message coprocessor via two memory-mapped regions over the local bus 69. The number of regions used may vary with the implementation; however the interface generally requires at least two regions. The first region, called the destination control region, is used to write destination control information from the received message to the message coprocessor. This region may also include a region, called the start region, which is used to provide a start signal to the message processor to indicate that it should start processing the destination control information written into the destination control region. A second region, called the reply region, stores replies from the message processor to the network interface. The network interface reads a reply from this region at an appropriate time. The reply region may be subdivided into two or more regions to communicate a command and arguments, such as an address for accessing the host memory, an address in local memory, an address in the message coprocessor, or other argument.

In operation, the network interface writes the appropriate data, i.e., the destination control information from the received message, to the destination control region then writes an instruction to the start region. The message coprocessor processes the destination control information which results in one of a small set of commands being written into the reply region and perhaps one or more arguments.

The receive side of the network interface has a small set of commands which it recognizes from the message coprocessor to simply the interface. These commands correspond to simple operations to be performed by the network interface, such as the following:

1. discard the message (for message filtering);
2. restore the control information to the front of the message;
3. store a specified amount of the remaining message in a free buffer;
4. store a specified amount of the remaining message at the address specified by the message coprocessor;
5. send more data from the message to the message coprocessor and read back another command;
6. initiate a reply, such as for remote read operations; and
7. initiate an interrupt to the host computer.

It should be understood that this list of commands is merely exemplary and is not limiting.

The reply region structure is generally a number of bytes of data, in which one portion indicates a command and one or more additional portions represent arguments. For example, one byte of data may represent a command. A second byte may represent an argument. Additional bytes may also be used for additional arguments. The command simply indicates which of the small number of commands to perform.

A specific format of the destination control region and the reply region in one embodiment is described in Appendix A. The command structure shown in Appendix A provides great flexibility for processing received messages. The control information size can vary per message by sending a fixed amount of destination control information to the coprocessor, which then can request that more control information be sent. The number of control segments can also vary. The coprocessor can indicate that another control segment follows immediately after. Explicit scatter DMA maps to one control segment per address-data pair. Implicit scatter DMA is supported by changing buffers in the middle of a message: a specified amount of data can be sent to one buffer, either externally supplied or from RXfree, and then the remaining data can be sent to one or more additional buffers. This flexibility could be used in TCP/IP processing to send the header to one buffer and the data to another buffer. In this case, the network interface writes zero data from the message to the coprocessor. The coprocessor just returns a command indicating to change the buffer after storing an amount of data equal to the TCP/IP header size.

With this interface the message coprocessor does almost all of the processing of the message and the operations which can be performed are programmable and entirely up to the user. The network interface merely pops message data from the data stack and reads back information which are interpreted as a small set of simple commands.

Figure 6A:
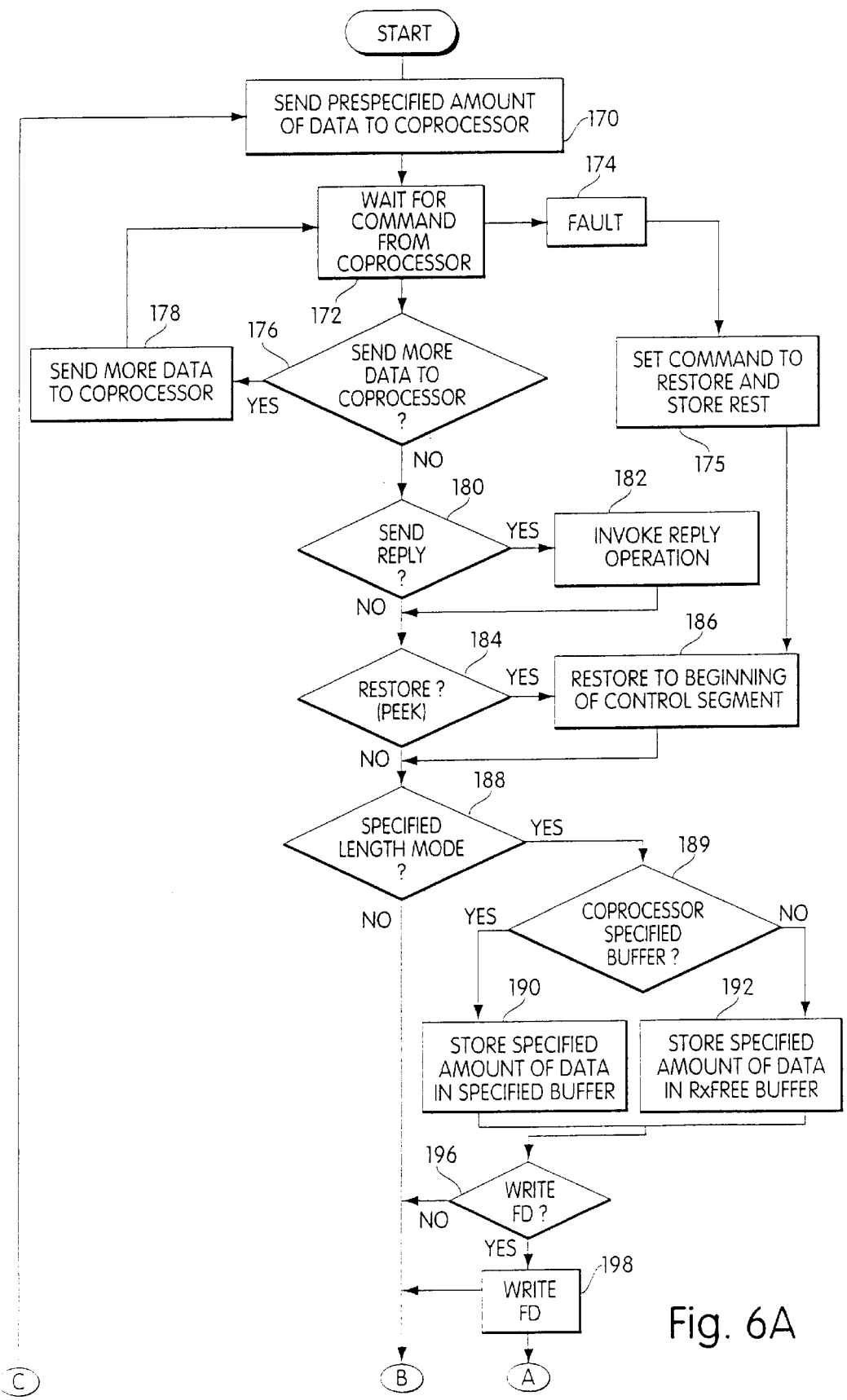
FIGS. 6A and 6B are a flowchart describing message processing on the receive side in accordance with this invention.
Figure 6B:
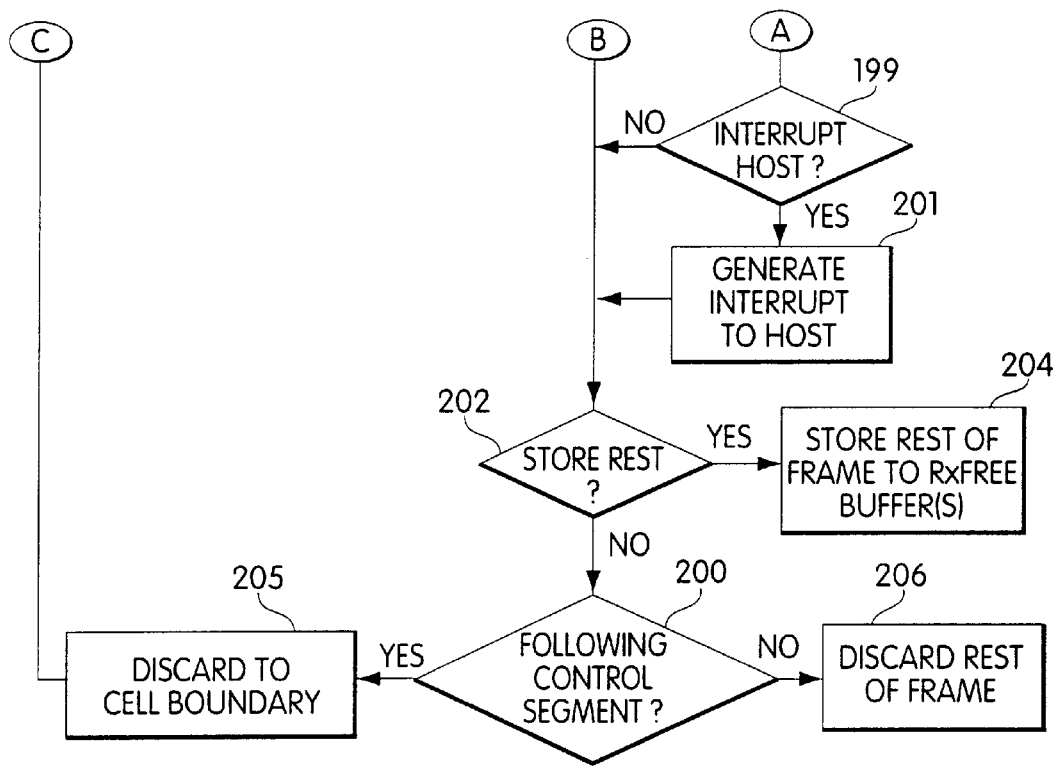

The process for the interaction between the network interface and the receive side message coprocessor 64 will now be described in connection with FIGS. 6A–6B. First, the network interface determines whether a received message is for a specially-marked virtual channel. If so, then the the process of FIGS. 6A–6B begins with step 170 of the network interface writing a prespecified amount of data, as indicatedin the RX VC table, to the message coprocessor 64. The network interface instructs the message coprocessor to proceed the information and wait in step 172 for a command to be returned. It may merely wait a specified number of local bus cycles and read a specified memory location in the memory-mapped interface for the command. This command is then interpreted by the network interface. The command word is formatted to indicate the command and any necessary arguments for the commands and thus contains two or more fields: one for the command name and one or more for arguments. If the command indicates a fault (step 174), the message processing operation is undone by a restore operation, and the message is treated as a normal message, in step 175. If the command is a request to send more information to the coprocessor, as determined in step 176, more data is sent to the coprocessor in step 178 and the network interface waits again in step 172. Steps 176 and 178 allow for variable lengths of control information for a given connection.

Processing continues with step 180 determining whether the command is a "send reply" command. This command invokes a remote reply operation in step 182, to send a message to another computer, which is described in more detail below in connection with FIGS. 8 and 9.

If the operation is a restore operation, as determined in step 184, the data read from the input message is pushed back onto the message, in processing buffer 158, in step 186. Processing continues with steps 188 through 200 which involve writing a specified amount of data from the message to either a region of memory at a specified address (step 190) or a free buffer from the free buffer list RXfree (step 192), as determined in step 189. If the processing of the message is complete or if the command from the message processor indicates that the rest of the message is to be discarded, as determined in step 196, then a frame descriptor is written into the RXdone queue, in step 198. After the frame descriptor is written, if the command from the message coprocessor indicates that an interrupt should be generated to the host processor (as determined in step 199), such an interrupt is generated in step 201. If message data remains, and if this remaining data should be stored, as determined in step 202, the message is stored in a free buffer from RXfree in step 204. Finally, if the message has a following control segment as determined in step 200, data to the end of the current control segment is discarded in step 205 and processing resumes with the next control segment of the message and step 170. Otherwise, the data is discarded in step 206 and processing terminates.

Having now described receive side processing, the transmit side of message processing support in the network interface will now be described in more detail in connection with FIGS. 7–10.

Figure 7:
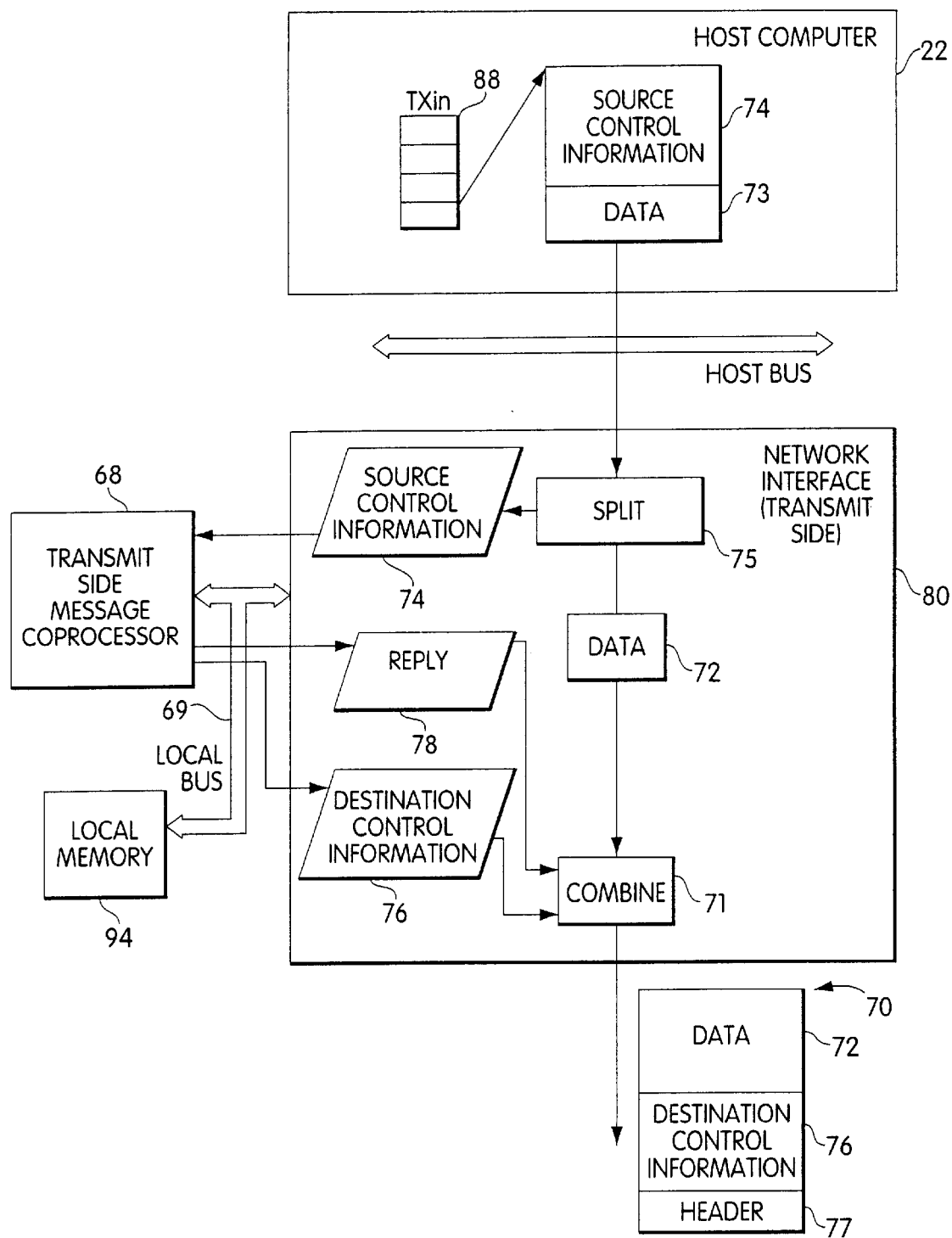
FIG. 7 is a schematic diagram of data flow on a transmit side of a network interface with message processing support in accordance with this invention.

FIG. 7 shows schematically the interaction and data flow through the host computer, network interface and transmit side message coprocessor 68. In transmission, the host computer generates a message containing source control information 74 and optionally data 73. The source control information, described in more detail below, indicates either the destination control information to be inserted in the outgoing message, where it is located or how to generate it. When the message is sent to the network interface, the network interface separates the source control information 74 from the data 73, as indicated at 75, to process the source control information. The source control information 74 is sent to the transmit side message coprocessor 68 which returns a reply 78. The reply may be a command to the network interface, either including the destination control information 76 for the outgoing message, or indicating the location of the destination control information 76 or indicating how to generate the destination control information 76. The destination control information is then combined, as indicated at 71, with data 72, coming either from data 73 or as otherwise specified by the reply command 78, into an outgoing message 70.

Figure 8A:
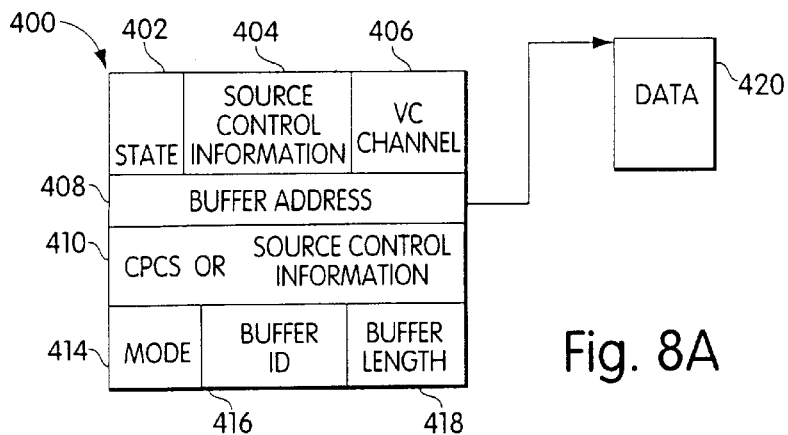
FIG. 8A illustrates a frame descriptor defining source control information.

The form of the source control information 74 will now be discussed in connection with FIGS. 8A–8B. The source control information generally is derived from a frame descriptor in the TXin queue. The frame descriptor, and thus the source control information, may be in a number of different formats. In one embodiment of the invention, as shown in FIG. 8A, a frame descriptor 400 has four lines of four bytes each of data. In the first line, the first byte 402 is state information, the second byte 404 is used for source control information in short command mode described below. The next two bytes 406 are for the VC channel number. The next line 408 is a buffer address or data pointer as referred to below. The third line 410 is either four bytes of additional source control information in short command mode, or otherwise is the CPCS trailer information for ATM AAL5. The last line includes one byte 414 of mode information, one byte 416 for a buffer identifier and two bytes 418 indicating buffer length.

The network interface may maintain a table entry for each virtual channel indicating what form of source control information to expect, or the frame descriptor may indicate the form of the source control information.

The simplest way to encode the source control information is to encode it directly in the frame descriptor as shown in FIG. 8A using fields 404 and 410. The frame descriptor 400 may also include a pointer to the data 420 to be sent in field 408. With this "short command" format, the size of the source control information is limited by the size of the frame descriptor. However, this format is good for low latency since the source control information and frame descriptor can be conveyed to the network interface with one memory operation.

Figure 8B:
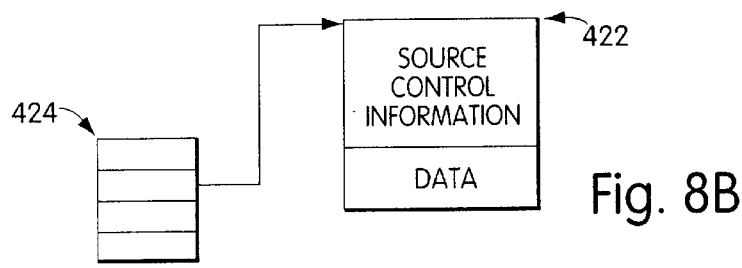
FIG. 8B illustrates a more complex encoding of source control information in a frame descriptor.
Figure 8C:
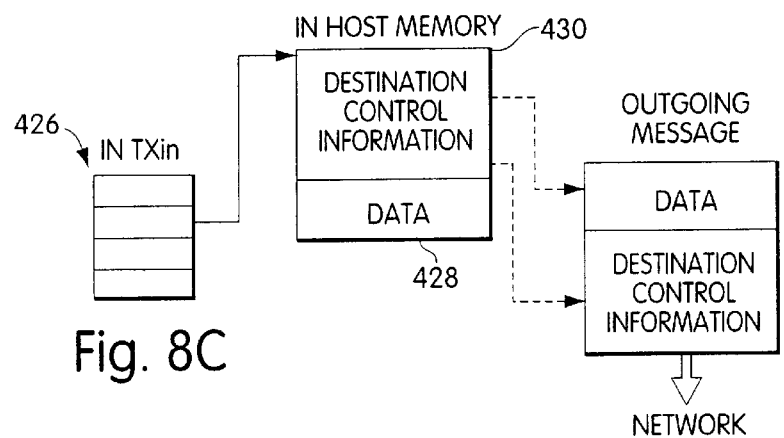
FIG. 8C illustrates a frame descriptor with no source control information.

For larger source control information, the direct encoding of the source control information is replaced, as in the frame descriptor 424 in FIG. 8B, by a reference or pointer in the field 408 to a location in host memory 422 which contains source control information. In either of these embodiments, the source control information is data to be sent to the transmit side message coprocessor as a command.

FIGS. 8C–8H show the range of possibilities for forming outgoing messages. In the form shown in FIG. 8C, the frame descriptor 426 contains no source control information. The data 430 to be sent, indicated using field 408, already includes destination control information 428 at the appropriate location. This mode is the normal mode used when the transmit side for a virtual channel does not support message processing, but where the destination does.

Figure 8D:
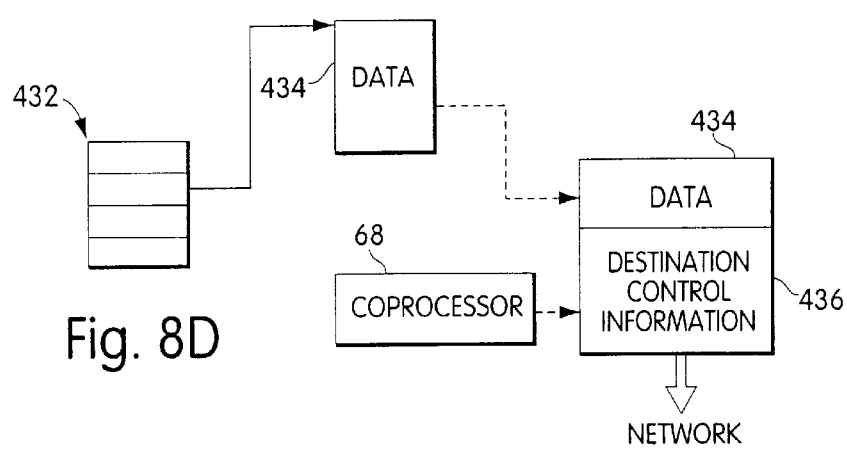
FIG. 8D shows a frame descriptor containing directly encoded source control information.

In FIG. 8D the frame descriptor 432 contains the source control information encoded directly in the frame descriptor using field 410, as in FIG. 8A, and a pointer to data 434 in field 408. The network interface prepends destination control information 436 generated by the transmit side message coprocessor 68 to the data pointed to by the frame descriptor to generate the outgoing message.

Figure 8E:
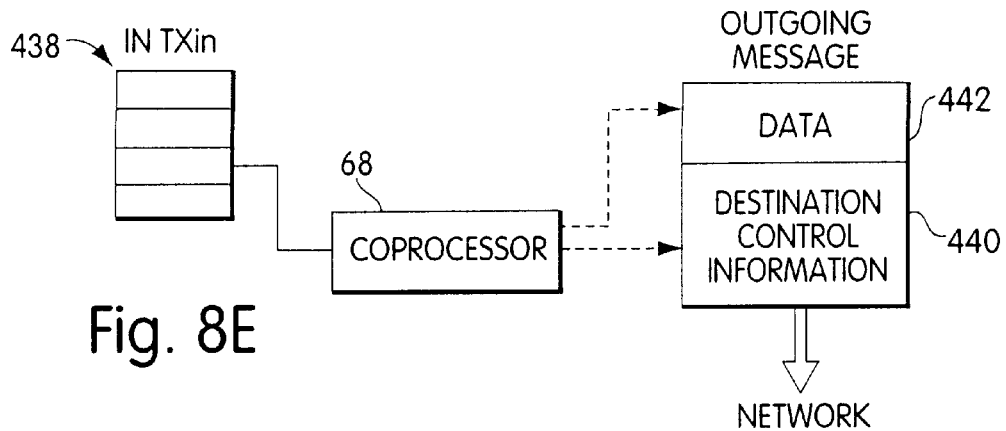
FIG. 8E illustrates another frame descriptor containing directly encoded source control information.

In FIG. 8E, the frame descriptor 438 contains the source control information encoded directly in the frame descriptor using field 410, as in FIG. 8A, and a unused data pointer. The transmit side message coprocessor 68 computes both the location of destination control information 440 and the location in host memory from which the data 442 should be taken.

Figure 8F:
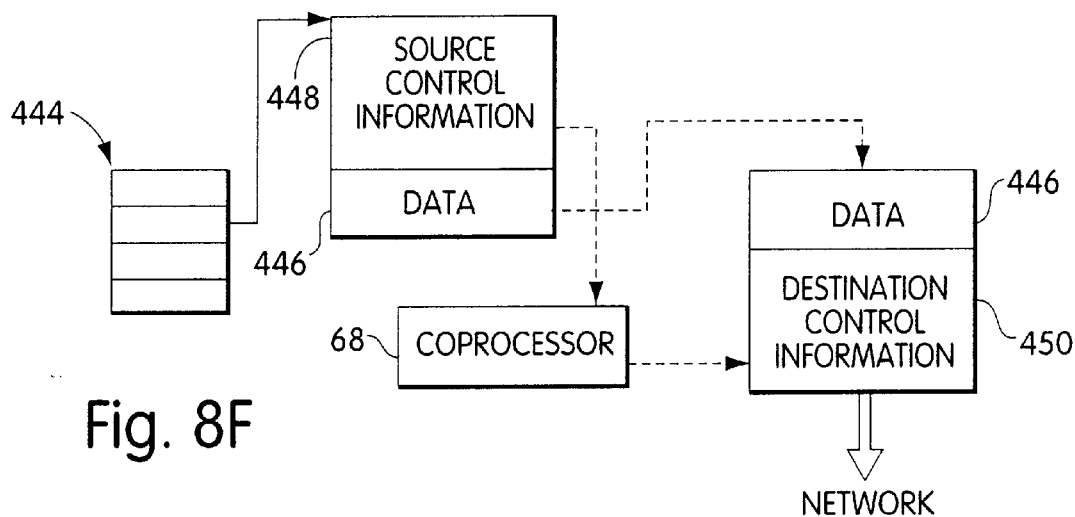
FIG. 8F illustrates a frame descriptor containing a field referring to a location containing source control information.
Figure 8G:
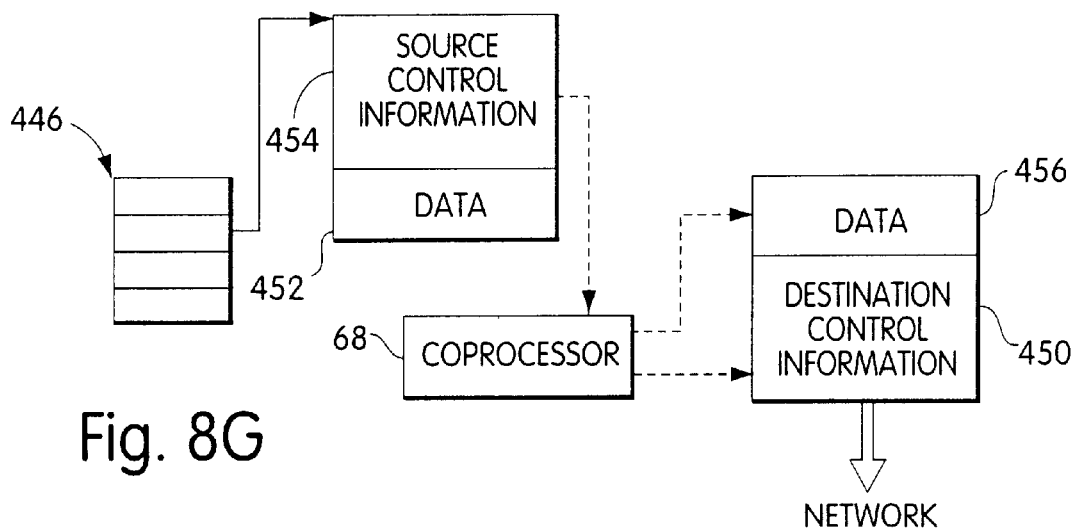
FIG. 8G illustrates a frame descriptor containing source control information from which the location of the data is computed.
Figure 8H:
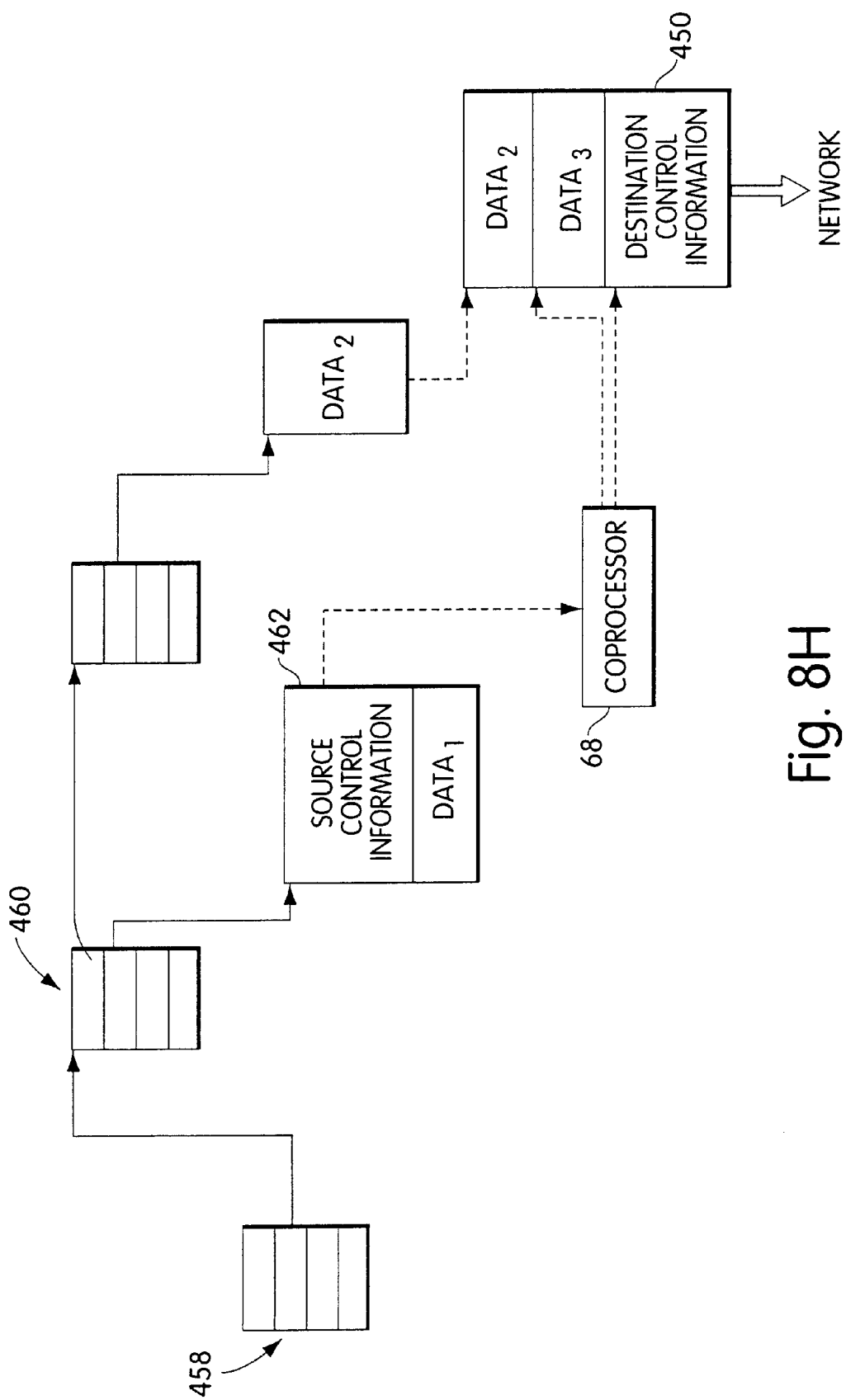
FIG. 8H illustrates a frame descriptor describing a linked list of buffers.

In FIGS. 8F through 8H, similar to FIG. 8B, the source control information is not embedded in the frame descriptor; instead, the frame descriptor data pointer indicates the location of source control information, as in FIG. 8B. In the frame descriptor 444 shown in FIG. 8F, the data 446 to be sent follows the source control information 448 at a location referred to using field 408. The transmit message side coprocessor 68 also generates destination control information 450.

In FIG. 8G, using a frame descriptor 447, any data 452 following the source control information 454 is ignored and the location of the data 456 to be sent is instead computed by the transmit side message coprocessor 68 based on information supplied in the source control information 454. The message transmit side coprocessor 68 also generates destination control information 450.

Finally, in FIG. 8H, the frame descriptor 458 describes a linked list of buffers 460. The first part of the first buffer is interpreted as source control information 462. The transmit side message coprocessor 68 computes the location of the destination control information 450 and the location of data 464 to be sent based on the source control information 462 supplied. Once this coprocessor-specified data is sent, the network interface ignores the remaining data in the first buffer in the linked list and sends data from the second and further data buffers in the linked list.

FIG. 9 is a block diagram of elements of the network interface relevant to transmit side message processing. In FIG. 9, a message processing controller 100 controls message processing by the network interface. Local bus 69 connects to a transmit side message coprocessor 68 and possibly a local memory 94 including a transmit side virtual channel (TX VC) table 97. The TX VC table includes, for each virtual channel, an indication 95 of whether the virtual channel is specially-marked for message processing, and if so, an indication 99 of the size of the source control information to send to the transmit side message coprocessor. The TX VC table 97 may also include an indication (not shown) of whether the virtual channel uses a frame descriptor which encodes directly the source control information. As indicated, the TX VC table 97 also contains other VC state information 89.

The general operation of the transmit side will now be described. The transmit side 80 of the network interface has the general task of prepending the destination control information 76 onto an outgoing message 70. Although the simplest way to append the destination control information 76 to a message is to allow a host computer to perform this function as in FIG. 8C, this way generally requires more host computer involvement and thus overhead in communication. To allow the transmit side 80 to determine and prepend the destination control information to an outgoing message, the host computer enqueues on the TXin queue a frame descriptor containing source control information for the message coprocessor and optionally some message data. The frame descriptor may be in any of the formats shown in FIGS. 8C–8H, but not limited thereto. The network interface first dequeues a frame descriptor from the TXin queue at an appropriate time. The frame descriptor is used first to determine the virtual channel to which it corresponds and to generate the header using the header processing circuit 116. For a normal message not requiring message processing operations, the network interface processes the message as described above in connection with FIGS. 1A to 1C. If the virtual channel is specially-marked, however, the network interface then identifies the location of the source control information using the frame descriptor or reads the source control information directly from the frame descriptor. The network interface then sends the source control information 74 to the transmit side message coprocessor 68 to perform the indicated processing. The transmit side message coprocessor in turn uses the source control information 74 to determine the destination control information 76, and the location of the data to append to the destination control information in the transmitted message at a location in the message specified by the TX VC table 97. The destination control information may either come from the source control information written to the transmit side message coprocessor or from arbitrary processing performed by the transmit side message coprocessor, e.g. from registers in the coprocessor, and is inserted in the outgoing message in the processing buffer 108. The message data may either come from the remainder of the originally enqueued message or from an address supplied by the transmit side message coprocessor. The address may be processed by the address generation module 112, mapping module 114 and DMA module 104 to access the data which is then appended to the message in the processing buffer 108.

The interface between the transmit side of the network interface and the transmit side message coprocessor 68 in one embodiment will now be described in more detail. On the transmit side 80, the network interface communicates with the message coprocessor 68 via memory mapped regions over the local bus 69. The number of regions used may vary with the implementation; however, the interface generally requires at least two regions: one to send source control information to the message coprocessor, called a source control region, and another to read a reply. The source control region may include a request region which receives a start instruction and other information, such as a VC number or state information. The reply region is used by the message coprocessor to communicate a command and associated arguments, such as destination control information or an address, to the network interface.

In operation, the network interface writes appropriate data, i.e., the source control information, to the source control region, and then writes a start instruction. The message coprocessor processes the source control information which results in one of a small set of commands being written into the reply region along with destination control information, an address or other arguments.

The transmit side of the network interface has a small set of commands which it recognizes from the message coprocessor to simplify the interface. These commands correspond to simple operations to be performed by the network interface, such as the following:

1. compose a message of data read from the message coprocessor;
2. compose a message of data read from the message;
3. compose a message of data read from a specified address, e.g., in host memory;
4. compose a message of data read from both message coprocessor and either the message or a specified address;
5. write a specified amount of data to the message coprocessor and read back another command; and
6. a fault has occurred in the message coprocessor.

It should be understood that this list of commands is merely exemplary and is not limiting. The command structure is generally a number of bytes of data, in which one portion indicates a command and one or more additional portions represent arguments. For example, one byte of data may represent a command. A second byte may represent an argument. Additional bytes may also be used for additional arguments. The command simply indicates which of the small number of commands to perform.

One embodiment of the structure of the source control region and the reply region is shown in Appendix B. This command structure provides great flexibility. The destination control information size can vary per message by sending a fixed amount of data to the message coprocessor which can then request more data representing control information. The coprocessor can either obtain the source control information from the first part of the message in TXin or from other fields in the frame descriptor in TXin. The destination control information can either come from the coprocessor or the message in TXin. Finally, the transmitted message data can either come from the remaining data in the message in TXin or from an address provided by the coprocessor. Each entry in TXin may cause multiple control segments (including destination control information and data) to occur in the transmitted message.

With this interface, the message coprocessor does almost all the processing, and the kind of processing to be performed is programmable and completely up to the user. The network interface merely writes data to the message coprocessor, reads back information which it interprets as a small set of simple commands.

Figure 10:
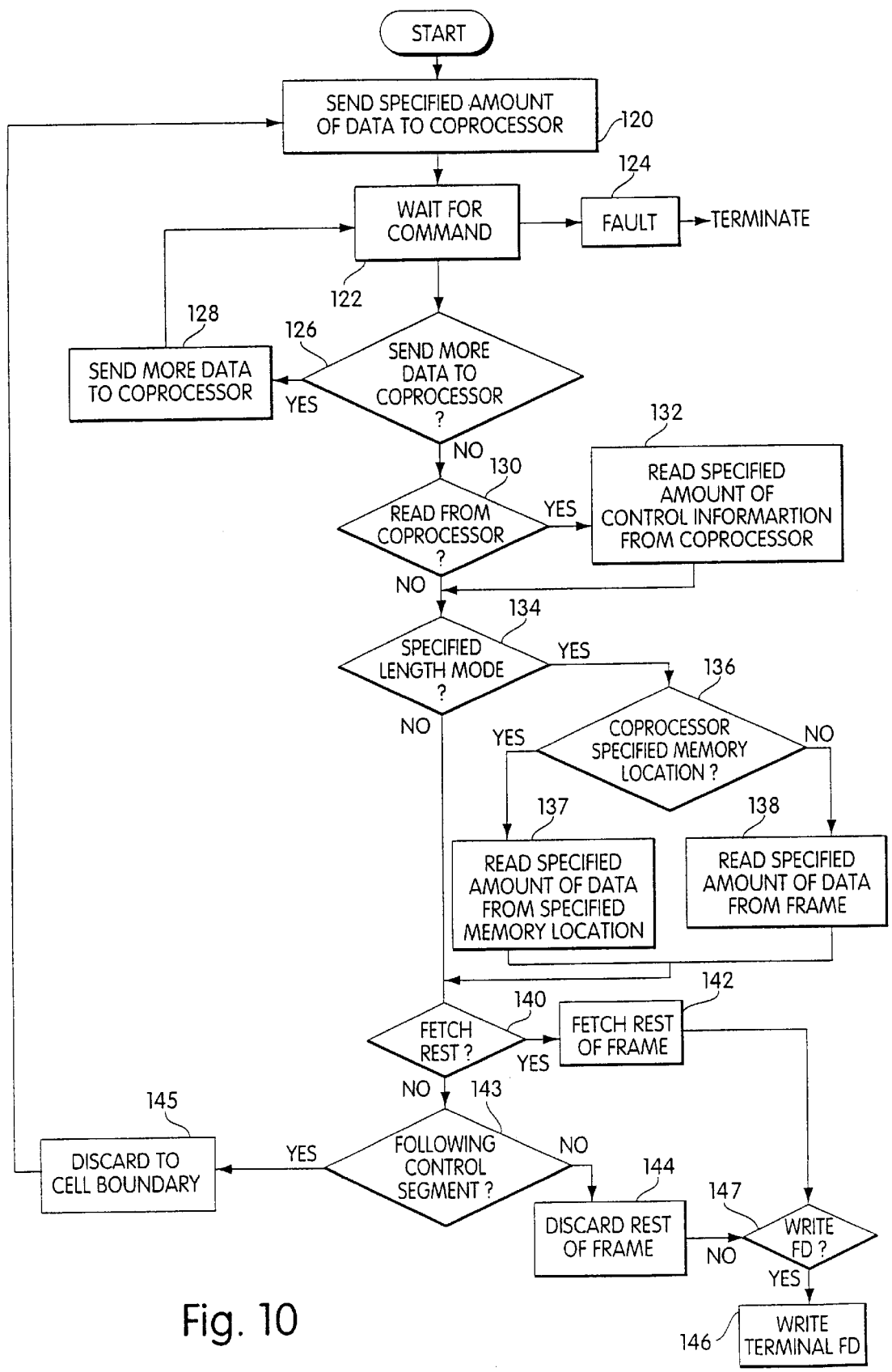
FIG. 10 is a flowchart describing message processing on the transmit side in accordance with this invention.

The process of the interaction of the network interface with the message coprocessor will now be described in more detail in connection with FIG. 10. First, the network interface retrieves the virtual channel information of the next message from the TXin queue to access the TX VC table 97. If the virtual channel is specially-marked for message processing, the process of FIG. 10 is performed.

In step 120, the network interface writes source control information to the message coprocessor via the source control region in the memory mapped interface. If the message does not have the specified amount of control data, an error occurs and the message processing operation is terminated or exception handling procedures are performed. The network interface then instructs the message processor to perform any required processing. The network interface then waits (step 122) a certain number of local memory bus cycles, if necessary, and then reads the command word written by the message coprocessor in the reply region of the memory mapped interface. The network interface then interprets the command word. The command word is formatted to indicate the command and any necessary arguments for the commands and thus contains two or more fields: one for the command name and one or more for arguments. If the command indicates a fault (step 124) then processing terminates. If the command is a request to send more information to the coprocessor, as determined in step 126, more data is sent to the coprocessor in step 128 and the network interface waits again in step 122. If the command indicates a request to read data from the coprocessor, as determined in step 130, a specified amount of data is read from the reply region of the memory mapped interface in step 132 and is used to form part of the output message.

Processing continues with step 134 determining whether a specified amount of data is to be read from another location, such as the message or from a specified address of an alternate buffer in host memory. The specified amount of data is then read from the appropriate source in steps 136, 137 or 138 and formed into the output message. If the rest of the message is to be used for the output message, as determined in step 140, that data is so formed into the output message in step 142. Otherwise, if another control segment begins (step 143), the remainder of the control segment being processed is discarded in step 145 and the next control segment in the message is processed starting with step 120. If there is no following control segment, the remainder of the message is discarded in step 144. Finally, if necessary, a frame descriptor is written in the TXdone queue in steps 147 and 146.

Figure 11:
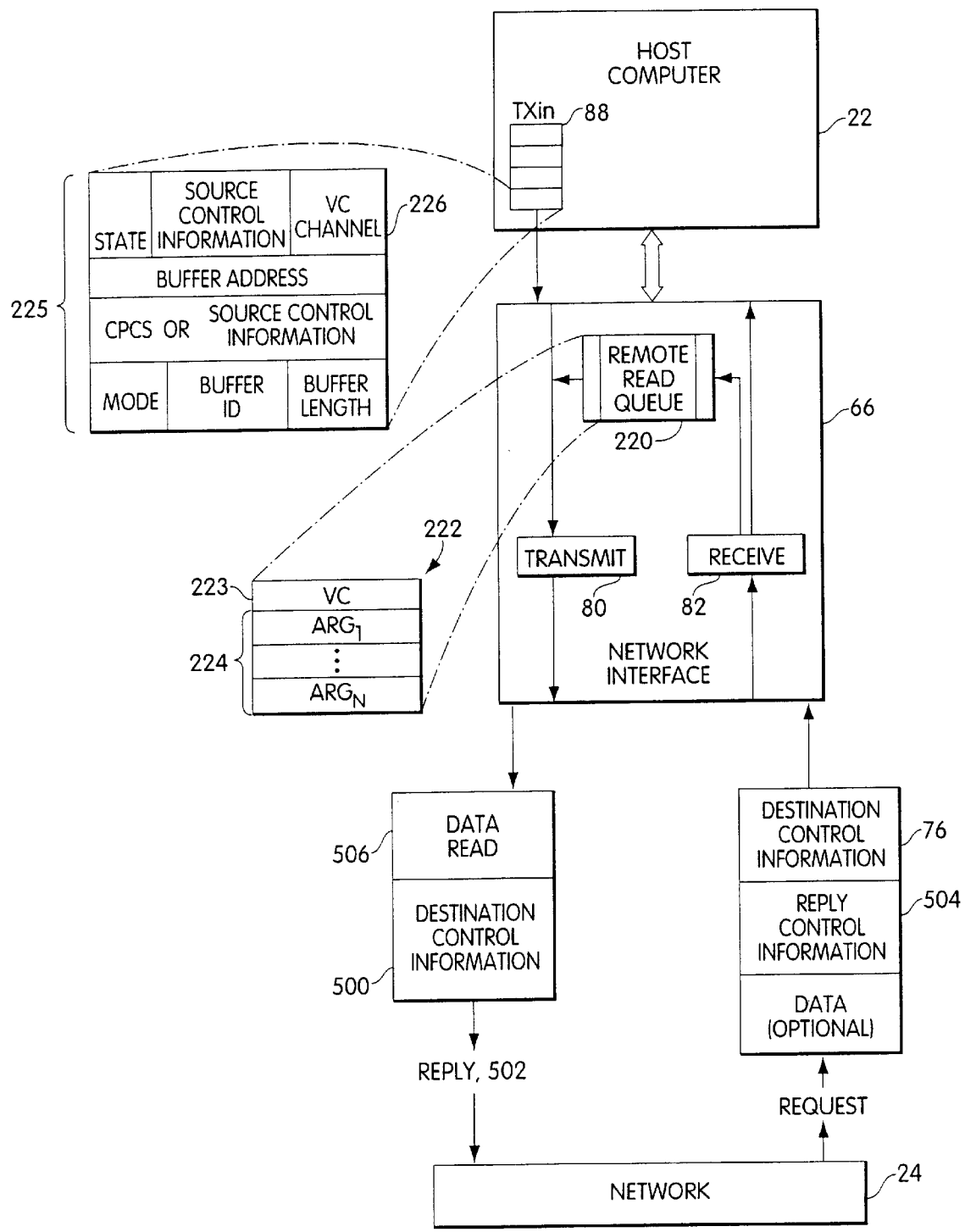
FIG. 11 is a block diagram showing support for remote operations with reply in a network interface in accordance with this invention.

The use of this system to perform remote operations with a reply, such as a remote read operation, will now be described in connection with FIGS. 11 and 12 which illustrate one embodiment of this aspect of the invention. Remote operations consist of write and read operations. Remote write operations, without host intervention, are supported by the architecture described above. For a remote write operation, destination control information in the message is decoded to determine a location in the host memory in which to write the data in the message. Remote reads are intrinsically more difficult to support since the received message must not only be decoded like a remote write, but a send operation must be initiated on the receiving end to provide the reply to the original sender. Nevertheless it is important to also support remote reads, since few applications perform only write operations. Other operations may also cause a form of reply message to be sent to the original sender, which involve steps similar to performing a remote read. The following description is provided using remote reads as an example. However, the kinds of operations which can be supported are any which cause a reply to be sent to the original sender.

Remote reads are supported by breaking a remote read into three parts. The first part is processing of a command, a remote write, at the destination. The remote write command may also contain the read command, address, size, and reply location and address. The second part is interpretation of the command by the host. The third part is initiation of a return remote write containing the reply to the requested read operation. Unfortunately, this implementation of a remote read operation places the host computer in the critical path to interpret the read command, which results in unacceptable latency in response to the read request and host loading. For example, in the systems shown in FIGS. 1A–1C and FIG. 2A, the host would have to process an incoming message, then generate an entry in the transmit queue, and then wait for that entry to be processed by the network interface. Consequently, this implementation is a solution of last resort.

In one embodiment of the present invention, the network interface has support which allows remote reads to bypass the host. Referring now to FIG. 11, this support includes a remote read queue 220 placed between the receive side 82 and the transmit side 80 of the network interface. The remote read queue may be as small as a single element queue or a FIFO. An element 222 in the remote read queue 220 includes an indication 223 of the virtual channel to which it pertains and arguments 224. In one embodiment, the format of the remote read queue element 222 is identical (aside from some bits in the first few bytes) to that of the frame descriptors 225 in the TXin queue 88. Alternatively, the remote read queue entry 220 may include a number of arguments which are different in form from the frame descriptor 225. In both the frame descriptor 225 and the remote read queue entry 224, the first few bytes includes an indicator of the virtual channel as shown at 223 and 226.

The network interface processes incoming remote read operations in the following manner. Initially, the network interface processes a remote read the same as a remote write. That is, the receive side writes a specified amount of the message data, i.e., the destination control information 76, to the receive side message coprocessor and then reads a command. Normally, this command from the receive side message coprocessor is performed by the receive side 82. However, if the command is a "send reply" command, the network interface invokes the same mechanism used by the transmit side 80 to prepend some control information to data accessed from a host memory location via DMA.

Figure 12:
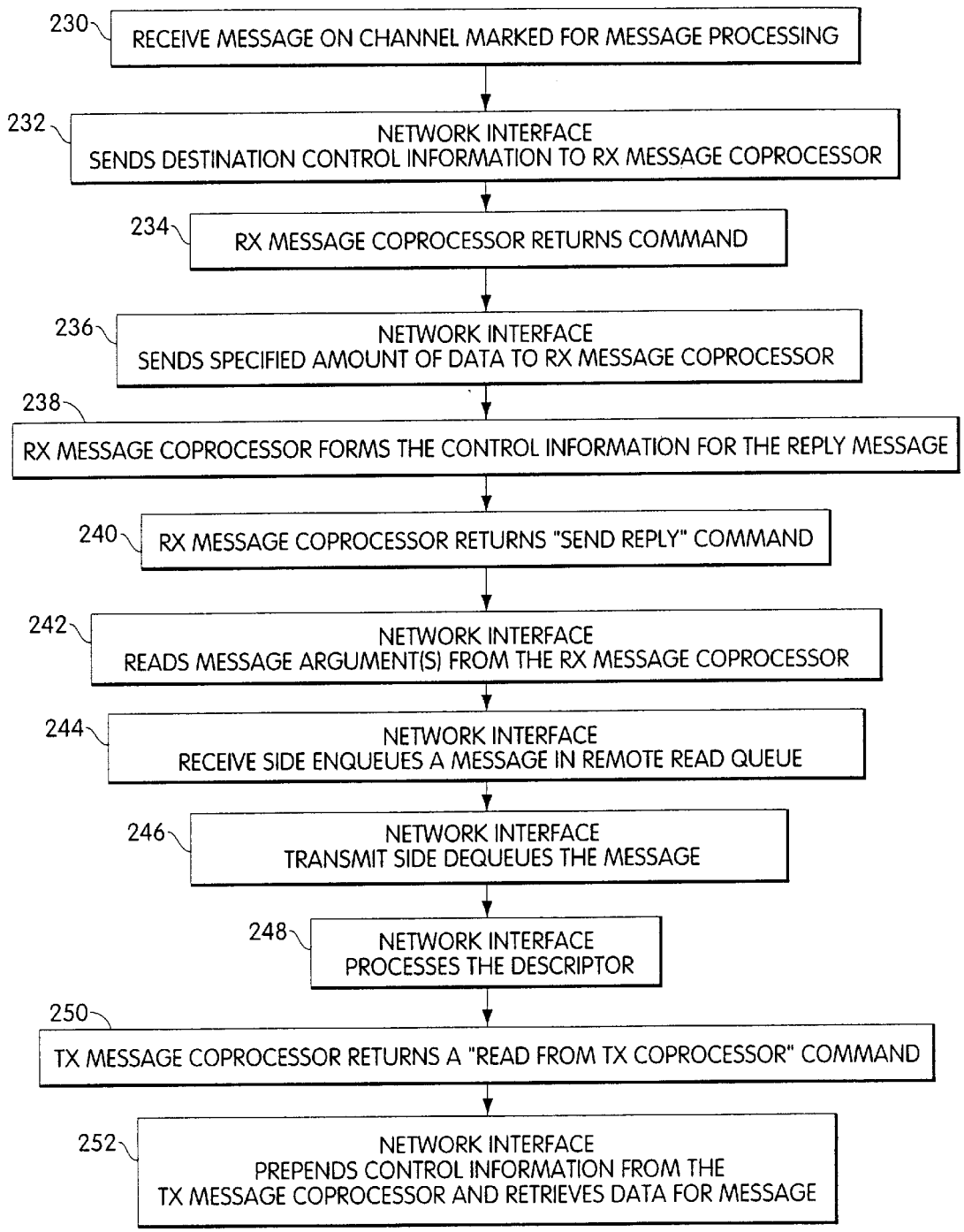
FIG. 12 is a flowchart describing the processing of a remote operation with reply.

FIG. 12 describes in more detail the operations for a particular embodiment which supports remote read operations. Other embodiments are possible. In particular, a system such as shown in FIG. 3 may be modified to include a remote read queue 220. In this embodiment, described in FIG. 12, a message is received on a connection marked for message processing (step 230). As for other operations on the receive side 82, the network interface then sends in step 232 a prespecified amount of destination control information to message coprocessor. This destination control information identifies the message as a remote read request and gives the address and size of the read. Referring for a moment to FIG. 11, the destination control information may also include some reply control information 504 to assist in generating destination control information 500 in the reply message 502. Referring to FIG. 12, the message coprocessor, in step 234, returns a command indicating that the network interface should send more data from the received message. The network interface then sends the requested amount of data, the reply control information 504, to message coprocessor to interpret as the reply location and address (step 236). In step 238, the message coprocessor forms the destination control information 500 for the reply message and stores it away in a memory location to be retrieved later. The message coprocessor returns "send reply" command to the network interface in step 240.

When the network interface detects a "send reply" command, it reads one or more message arguments from one or more additional data fields in the command region of the memory mapped interface (step 242). Such arguments include data which the transmit side will use to generate destination control information and the source for the data for the outgoing message. The receive side 82 of the network interface, in step 244, enqueues in the remote read queue 220 a message indicating both the virtual channel and the message arguments, which the transmit side 80 will later process. By using the remote read queue 220, the receive side 80 of the network interface can avoid writing an entry to host memory in the TXin queue. Depending on the implementation of the remote read queue, the enqueued data may be a single word or multiple data words.

The transmit side periodically polls the remote read queue and, at some time (step 246 in FIG. 12), the transmit side 80 dequeues the entry from the remote read queue 220. The transmit side 80 uses the data in the remote read queue to obtain data that it would otherwise obtain from a frame descriptor. Because the transmit side can process frame descriptors which include the source control information, without requiring access to the host computer to obtain this information, the receive side should generate such source control information in the remote read queue. Otherwise, the transmit side must perform special handling of data in the remote read queue. In one embodiment, as shown in FIG. 11, the remote read queue elements have exactly the same format as frame descriptors in TXin, so the transmit side may process read queue elements just like TXin entries. In particular, the indicated connection may or may not be specially marked. If not specially marked, the transmit side processes step 248 the read queue element just like a frame descriptor from TXin describing a buffer to transmit. If the connection is specially marked, the transmit side initiates message processing, storing the arguments from a read queue element to the transmit side message coprocessor as source control information.

The transmit side message coprocessor in step 250 returns any appropriate command, such as a "read from coprocessor" command to read the destination control information and "read from external address" command to DMA the data from the host memory. The network interface then pushes the previously saved destination control information 500 read from the message coprocessor into the front of the message and then initiates a DMA from the given location in host memory for the read reply data (step 252). Thus, a message containing the requested data 505 and control information for use by the requestor is sent to the requester.

An embodiment of the control information and reply command structure for the message coprocessor interface to support remote replies is shown in Appendix C.

This implementation of remote read operations exploits both the receive and transmit side message processing support. Contention for access to the transmit side message coprocessor is handled by the network interface by waiting until the appropriate time to process the reply message.

4. The network interface interprets the command as described in detail below.

This message processing activity occurs only if both the global RX_MP_enable flag is set and the per VC flag MP_on_rxvc is set. If RX_MP_enable is clear but MP_on_rxvc is set, then MP_on_rxvc is cleared.

2. Formats 2.1 Co-processor fields

The message co-processor has the following fields for RX side message processing:

| Address | Field Name | Function |
| --- | --- | --- |
| RX_MP_CNTL_BASE+0 | RX_MP_GO_VC | Start signal and virtual channel channel (write) |
| RX_MP_CNTL_BASE+4 | RX_MP_CMD | command processing (read) |
| RX_MP_CNTL_BASE+8 | RX_MP_EXT_ADDR | external address (read) |
| RX_MP_CNTL_BASE+12 | RX_MP_MSG_ARG1 | reply msg arg1 (read) |
| RX_MP_CNTL_BASE+16 | RX_MP_MSG_ARG2 | reply msg arg2 (read) |
| RX_MP_CNTL_BASE+20 | RX_MP_MSG_ADDR | reply msg data address (read) |
| RX_MP_DATA+0 to RX_MP_DATA+48 | n/a | memory region to receive control info from first cell in frame segment |

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims. For example, there are of course a wide variety of implementations of the support in the network interface for message processing. For example, direct hardware execution using sequential and combinational logic, microprogrammed state machines using sequential logic, and microprocessor cores may be used to implement the transmit and receive sides. The kind of interface between the network interface and the message coprocessor may also take a variety of forms. For example, a bus interface may be provided which allows the message coprocessor to communicate actively with the network interface. Alternatively a passive interface such as the described memory mapped interface may be used. It should also be understood that the protocol for exchange of information can also take a variety of forms.

Appendix A: Receive-side Specifications

1. The operation of the RX side message processing support is as follows:

1. When the first cell of a ATM AAL0 or AAL5 frame arrives, the network interface writes N (32 bit) words of control information at the beginning of the cell to the message co-processor beginning at the physical address specified by register RX_MP_DATA. N is specified in the virtual channel (VC) table entry and must be not larger than 10 if the cell is an AAL5 end of frame and 12 otherwise.

2. The network interface writes a single word containing the VC channel number and a GO signal to the physical address specified by the contents of register RX_MP_CNTL_BASE (contents denoted by <RX_MP_CNTL_BASE>).

3. The network interface reads a comrnand word back from the co-processor at location <RX_MP_CNTL_BASE>+4.

2.2 GO_VC field

The value written to co-processor location MP_RX_GO_VC is 32 bits wide with the following format:

| 31 | 30 | 29 |  | 23 |  | 19 |  | 15 | 0 |
| --- | --- | --- | --- | --- | --- | --- | --- | --- | --- |
| g | c | crc | unused | size |  | end |  | VC channel | |

GO[31] is the go_flag indicating if the field is avalid GO command.

GO[30] is the cont_flag indicating if the information just written to RX_MP_DATA and signalled by this GO command is a continuation of information from the same control segment (i.e. multiple writes of data from the same cell, as in the send_more option).

GO[29] is the result of the CRC-10 check of the cell payload

GO[23:20] is the number of words just written to RX_MP_DATA

GO[19:16] is the end position in RX_MP_DATA, i.e. the offset of the last word written to the co-processor from the base RX_MP_DATA.

GO[15:0] is the VC channel number

The remaining fields are unused.

2.3 Command field

The command read back from co-processor location MP_RX_CMD is 32 bits wide with the following fields:

[31:24] is the command

[23:16] is command argument 1. In send more_mode [19:16] indicates the number of additional words to read from the co-processor. In send_reply mode [23:16] is 8 bits of control information to pass to the TX side via the MSG_CNTL field in the MSG FIFO. These two modes are mutually exclusive.

[15:2] is command argument 2. In length_mode, indicates the amount of data, P, in words, to store to a buffer.

[1:0] is two auxiliary command bits. In MP_problem mode the least significant bit indicates if MP_RX_enable should be cleared.

The command has the format:

| 31 | | | | | | | 24 | |
|---|---|---|---|---|---|---|---|---|
| MP_fault | send_more | send_reply | restore | length_mode | buff_mode | skip_1st_FD | store_rest | |
| | 1 | | | | | 0 | | |
| | int_1st_FD | | | | | cont | | |

CMD[31]—MP_problem indicates that a co-processor problem occurred.

If CMD[31] is asserted, MP_on_rxvc is cleared, the command is modified instead to be a "restore" followed by "store_rest" to store the entire frame into a RXfree buffer, and the host is notified of the problem. If CMD[0] is set, the problem is a fatal MP fault, and MP_RX_enable is cleared; otherwise the problem is a MP error. Whatever the value of CMD[0], MP_on_rxvc is cleared, the status field of the next frame descriptor written for the VC indicates "MP_prob", and a "RX MP interrupt" is generated after storing the next frame descriptor for the VC.

CMD[30]—send_more indicates that the network interface should send more control words to co-processor and reread command. If set, the number of additional words is specified by command arg 1. The send_more command may be repeated multiple times until no more than 10 words if the cell is an AAL5 end of frame or 12 words otherwise. To avoid infinite loops at least one word is sent. If at any point the total words of control information exceeds this number (whether due to a send_more command or the original cntl_len specified in the VC entry), the same action as a MP error occurs except the status field indicates "MP_size_err".

CMD[29]—send_reply indicates the network interface should enqueue a message in the MSG FIFO to cause the TX side to initiate a send. Command arg1 specifies 8 bits of control information to include in the MSG fields. If the MSG FIFO is full, then same action as a MP error occurs except the status field indicates "MP_msg_full".

CMD[28]—restore indicates the network interface should restore all words of control information written to the co-processor to the front of the frame. This pushes the control information back onto the frame to effect a "peek" operation. Sending control info to the co-processor is normally a "pop" operation.

CMD[27]—length_mode indicates the network interface should write the next P bytes from the incoming frame to the destination indicated by CMD[26]. Command argument 2 specifies P.

CMD[26]—buff_mode indicates if the network interface should write to a buffer starting at the external address read from location RX_MP_EXT_ADDR or from a buffer fetched from RXfree. This external address is interpreted as a virtual address and is translated to a physical address using the translation table appropriate for the VC.

CMD[25]—skip_1st_FD indicates if the network interface should skip writing out the first frame descriptor for this frame to RXdone. CMD[24]—store_rest indicates if the network interface, after following above actions, should store the rest of the frame to one or more buffers obtained from RXfree (as in the usual RX side operation). Otherwise, the network interface discards the rest of the incoming frame.

CMD[1]—int_1st_FD generates an RXdone frame interrupt when the first frame descriptor for the frame is written to RXdone (if not skip_1st_FD).

CMD[0]—cont indicates control segment follows. If set, after all the above actions are completed, the network interface discards any remaining data from the incoming frame until the next cell boundary and then the network interface repeats the above protocol.

2.4 RX VC Table Entries

The MP receive-side uses the following 8 bits in the first word of each RX VC table entry. The format of the MP_control field is as follows:

MP_control[7] is MP_on_rxvc which indicates if MP is enabled for this VC

MP_control[6] is start_of_segment which indicates if the cell received is the beginning of a control segment and thus should be interpreted as a MP cell, providing that MP is enabled for the VC.

MP_control[5] is FD1, a control bit used for retaining MP state information

MP_control[4] is FD0, another control bit used for retaining MP state information MP_control[3:0] is cntl_len, the number of words of control information the network interface should initially send to the RX message co-processor upon receiving the first cell in the VC, provided that MP is enabled the VC. FD1 and FD0 define control states used in the implementation of the commands.

Appendix B: Transmit-side Specifications

1. The operation of the transmit-side message processing support is as follows for virtual channels in MP mode:

1. If a VC is in short command mode, then when a frame descriptor for that VC is found in TXin, the network interface stores 8.5 bytes of control information contained in the frame descriptor into temporary locations in the TX VC table.

2. If a VC is in short command mode, then when a frame is first scheduled for transmission, the network interface writes, starting at the physical address specified by the contents of register TX_MP_CNTL_BASE two words of control information followed by a word containing the VC channel number, some additional control information, and a GO signal. If a VC is not in short command mode, then at the start of every frame control segment, the network interface writes the specified initial number of words of source control information from the beginning of the control segment to consecutive addresses beginning at TX_MP_DATA_IN. The network interface then writes a word containing the VC channel number, the number of words just written to the coprocessor, and a GO signal to location <TX_MP_CNTL_BASE>+8.

3. The network interface then reads back a command word from the coprocessor from the physical address contained in <TX_MP_CNTL_BASE>+12. 4. The network interface interprets the command as described in detail later. This message processing activity occurs only if both the global TX_MP_enable flag is set and the per VC flag MP_on_txvc is set. If MP_on_tx_vc is set but TX_MP_enable is clear, the frame is aborted by writing a frame descriptor to TXdone with "MP_disabled" in the status field.

2. Formats
2.1 Co-processor fields

The message co-processor has the following fields for transmit side message processing:

| Address | Field Name | Function |
| --- | --- | --- |
| TX_MP_CNTL_BASE+0 | TX_MP_CNTL1 | First word of control info (write) |
| TX_MP_CNTL_BASE+4 | TX_MP_CNTL2 | Second word of control info (write) |
| TX_MP_CNTL_BASE+8 | TX_MP_GO_VC | Start signal and VC channel (write) |
| TX_MP_CNTL_BASE+12 | TX_MP_CMD | command processing (read) |
| TX_MP_CNTL_BASE+16 | TX_MP_ADDR | destination control info address (read) |
| TX_MP_CNTL_BASE+20 | TX_MP_EXT_ADDR | external address (read) |
| TX_MP_DATA_IN+0 to TX_MP_DATA_IN+48 | n/a | memory region to receive source control info from host |

2.2 Control information

The control info sent to the message co-processor is packed into the frame descriptor. For short command mode, 8.5 bytes of source control information are extracted from the fram descriptor as follows. TX_MP_CNTL1 is 3.5 bytes from the contents of the buffer ID and buffer length fields. The specific format of TX_MP_CNTL1 is

| 31 | 27 | 15 | 0 |
| --- | --- | --- | --- |
| 0000 | buffer_ID | buffer_length | |

The buffer length retained by the network interface (in the TX VC table) may subsequently be changed by a co-processor command. The buffer ID is unchanged. TX_MP_CNTL2 is 4 bytes from the contents of the CPCS field in the frame descriptot. A final 1 byte of control information is extracted from the upper 8 bits of the VPI/VCI field and passed via the GO_VC command.

2.3 GO_VC field

The value written to co-processor location MP_TX_GO_VC is 32 bits wide with the following format:

| 31 | 30 | 29 | 28 | 27 | 26 | 24 | 23 | 16 | 15 | 0 |
| --- | --- | --- | --- | --- | --- | --- | --- | --- | --- | --- |
| g | c | t | m | s | | unused | cntl/size&end | | VC channel | |

GO_VC[31] is the go_flag indicating if the field is a valid GO command.

GO_VC[30] is the cont_flag indicating if the information just written to TX_MP_DATA_IN and signalled by this GO command is a continuation of information from the same control segment (i.e. multiple writes of data from the same cell, as in the send_more option).

GO_VC[29] is a AAL type flag. It is 0 for ATM type AAL0 and 1 for type AAL5.

GO_VC[28] is a mode indication: it is 0 for short command mode (source control information is in TX_MP_CNTL1 and TX_MP_CNTL2) and 1 for long command mode (source control information is stored starting at <TX_MP_DATA_IN>).

GO_VC[27] indicates the source: 0 indicates from TXin; 1 indicates MSG FIFO

GO_VC[23:16] is 1 byte of source control information in short command mode.

GO_VC[23:20] is the number of words just written to TX_MP_DATA_IN in long command mode GO_VC[19:16] is the end position in TX_MP_DATA_IN if long command mode GO_VC[15:0] is the VC channel number

2.4 Command field

The command read back from co-processor location MP_TX_CMD is 32 bits wide with the following fields:

[31:24] is the command

[23:16] is command argument 1. Indicates M, the number of words to read from the address specified by TX_MP_ADDR.

[15:2] is command argument 2. In length_mode indicates the amount of data, in words, to fetch for the transmitted frame.

[1:0] is auxiliary command info. In MP_problem mode the CMD[0] indicates if MP_TX_enable should be cleared. The command has the format:

| 31 | | | | | | | | 24 |
| --- | --- | --- | --- | --- | --- | --- | --- | --- |
| MP_fault | send_more | unused | read_coproc | length_mode | buff_mode | no_FD_wr | fetch_rest | |
| 1 | | | | 0 | | | | |
| unused | | | | cont | | | | |

CMD[31]—MP_problem indicates that a co-processor problem occurred. If CMD[0] is set, the problem is a fatal MP fault, and MP_TX_enable is cleared. Otherwise, the problem is an MP error. In either case the frame is aborted by writing a frame descriptor to TXdone with a "MP_prob" in the status field.

CMD[30]—send_more indicates that the network interface should send more control words to co-processor and reread command. If set, the number of additional words is specified by command arg1. The details are the same as for send_more on the receive side.

CMD[28]—read_coproc indicates the network interface should read from co-processor. If set, the network interface forms the first M words of the transmitted frame (usually the destination control info) by reading words starting at the physical address given by TX_MP_ADDR. M is truncated to 12.

CMD[27]—length_mode indicates the network interface should follow the first M words, if any, read from co-processor with P bytes read from the data buffer. This mode changes the length of the data buffer, changing the buf_len field in the segmentation table to P. If P is larger than the originally specified buffer length, an error is reported using MP_pend_err. If P is smaller than the originally specified buffer length, the buffer is truncated and the remaining data in the original buffer is not sent. Command argument 2 specifies P.

CMD[26]—buff_mode indicates if the network interface should read from an externaladdress or from the input frame. If set, the network interface fetches the amount of data specified in command argument 2, starting at the virtual address read from location TX_MP_EXT_ADDR.

CMD[25]—no_FD_wr indicates if the network interface should skip writing out a frame descriptor to TXdone. Writing an frame descriptor is optional, controlled by this command bit.

CMD[24]—fetch_rest indicates if the network interface, after following above actions, should follow the above data with the data from the rest of the frame indicated by the frame descriptor. Otherwise, the network interface discards the rest of the frame indicated by the frame descriptor (if no control segment follows).

CMD[0]—cont indicates control segment follows. If set, after all the above actions are completed, the network interface discards any remaining data from the incoming frame until the next cell boundary and then the network interface repeats the above protocol.

The remaining fields are unused 2.5 TX VC Table Entries

TX side MP uses the following 12 bits in the first word of each TX VC table entry. The format of the MP_control field is as follows:

MP_control[0] is MP_on_txvc which indicates is MP is enabled for this VC

MP_control[1] is MP_src_fRx which indicates if the frame descriptor originated from the RX side, i.e. was found in the MSG FIFO MP_control[2] is MP_pend_err which indicates that a buffer size error occurred MP_control[3] is Start_segment which indicates that the network interface is segmenting the first cell of a frame segment.

MP_control[4] is short_command which indicates if the VC is in short command mode or not MP_control[5] is skip_FD_write which indicates that the network interface should not write a frame descriptor to TXdone MP_control[6] is discard_rest which indicates that the network interface should discard the rest of the frame MP_control[7] is unused MP_control[11:8] indicates initial number of words of control info network interface should write to the co-processor in long command mode.

Whenever the TX side writes a frame descriptor for a VC to TXdone, it ORs the MP_src_fRx and MP_pend_err bits into the status field in the frame descriptor.

Appendix C: Reply Messages

1. Queue elements

As indicated earlier the send_reply command on the RX side instructs the TX side to send a reply message. The RX side uses a FIFO queue to communnetwork interfaceate information from the RX side to the TX side following a send_reply command. Each queue element has the following four fields:

MSG_CNTL[32]—contains a tag, the VC channel number for the reply message, and some control information.

MSG_ARG1 [32]—contains a 3.5 byte argument, which includes the length, in bytes, of the reply message data MSG_ARG2[32]—contains a 4 byte argument MSG_ADDR[32]—contains the virtual address for the reply message data 2. Operation The RX side writes the lower 28 bits from location RX_MP_MSG_ARG1 into MSG_ARG1 to be sent to TX_MP_CNTL1), the 32 bits from location RX_MP_MSG_ARG2 into MSG_ARG2 (to be sent to TX_MP_CNTL2), and the address read from location RX_MP_MSG_ADDR into MSG_ADDR. The TX side interprets these FIFO fields in the same format as fields in frame descriptors as follows:

MSG_CNTL corresponds to the first field of a frame descriptor. It contains the VC channel number, 1 byte of control information, and a 8 bit field shown later.

MSG_ARG1 corresponds to the fourth field of frame descriptor and contains two fields, a 12 bit field with no fixed interpretation, and a 16 bit field which is interpreted as the length of data to send for the given data buffer. The upper 4 bits are unused.

MSG_ARG2 corresponds to the third field of a frame descriptor and contains the argument MSG_ADDR corresponds to the second field of a frame descriptor and contains the base address of the data buffer to read (virtual address)

Using these registers the RX side builds a frame descriptor which it then passes to the TX side to process. The TX side processes this contrived "frame descriptor" the same as a real frame descriptor.

The TX side must poll the MSG FIFO continuously, even if it is not currently polling TXin. A frame descriptor remains in the MSG FIFO until the VC for which it destined is idle and thus ready to accept the frame descriptor.

3. Formats

MSG_CNTL has the following format:

| 31 | 30 | 29 | 28 | 25 | 24 23 | 16 | 15 | 0 |
|---|---|---|---|---|---|---|---|---|
| present | rsvd | daa_num | aal_type 0 0 | pti_lsb | 0 | cntl-info | VC channel | |

This closely aligns with with the format of the first field of a frame descriptor.

MSG_CNTL[31] is a present bit indicating if the MSG queue element is occupied

MSG_CNTL[30] is reserved

MSG_CNTL[29] is the ring queue set identifier

MSG_CNTL[28] is the AAL type of the reply message: AAL0 or AAL5

MSG_CNTL[27:26] is unused

MSG_CNTL[25] is the least significant bit of the payload type indicator field

MSG_CNTL[24] is unused

MSG_CNTL[23:16] is 8 bits of control info

MSG_CNTL[15:0] is the VC channel for the reply message

4. Implementation

If the MSG FIFO is full when another message arrives that causes a send_reply request, the network interface clears MP_on_rxvc, forces a "restore" command on the message, and dumps the entire message to a RXfree buffer for the host to deal with. The network interface is responsible for resetting the MP_on_rxvc bit in the RX VC table entry to re-enable message processing.

The RX side must not set the present bit in MSG_CNTL, thereby making the MSG queue element available to the TX side, until the first cell of the message has been processed. This ensures that any message processing and storage of data in the first cell is completed before the TX side starts processing the reply message. The reply message should not refer to data contained in subsequent cells of the message since those cells might not have arrived at the time that the TX side processing for the reply message refers to them.

I claim:

1. A receive side of a network interface for connecting a host computer having a processor and a memory to a network, wherein the network connects the host computer to a plurality of computers, wherein the host computer and each of the plurality of computers has a separate memory and operating system, the receive side of the network interface comprising:

means, in the network interface, for receiving a message from one of the plurality of computers containing data and destination control information which indicates an operation to be performed on the message data;

means, in the network interface, for extracting the destination control information from the received message and for communicating the extracted destination control information to a programmable message coprocessor connected to the network interface and separate from the operating system of the host computer;

means, in the network interface and operative after communication of the extracted control information to the programmable message coprocessor, for receiving a command and arguments generated by the programmable message coprocessor; and means for performing at least one of a small set of operations on the received message according to the received command and arguments while bypassing the operating system of the host computer.

2. The network interface of claim 1, wherein the message coprocessor is external to the network interface, and wherein the network interface is an integrated circuit comprising a message controller implementing said means for extracting destination control information from a received message and for communicating the extracted information to the message coprocessor and for receiving the command and arguments from the message coprocessor and for executing the command with the arguments.

3. The network interface of claim 2, wherein the interface in the network interface is a memory-mapped local bus connected to the external message coprocessor.

4. The network interface of claim 1, wherein the destination control information is written to a designated memory location on a memory-mapped bus connecting the network interface to the message coprocessor.

5. The network interface of claim 1, wherein the command received from the message coprocessor has a format defining a first field indicating one of a small set of operations to be performed by the network interface and a second field indicating one or more operands.

6. The network interface of claim 5, wherein the command is read from a designated memory location on a memory-mapped bus connecting the network interface to the message coprocessor.

7. The network interface of claim 5, wherein the command has a format including one separate bit for each possible operation to be performed by the network interface.

8. The network interface of claim 1, wherein the means for receiving and executing the command includes means, operative in response to the command, for reading and sending more data from the received message to the message coprocessor and for repeating, receiving and execution of a further command from the message coprocessor.

9. The network interface of claim 1, wherein the means for receiving and executing the command includes means for generating a reply operation command and placing a reply command in a reply queue accessible by a transmit side of the network interface.

10. The network interface of claim 1, wherein the means for receiving and executing the command includes means for restoring the received message to an original state prior to having read the destination control information.

11. The network interface of claim 1, wherein the command indicates a specified length of data from the message to be written by the network interface, and wherein the means from receiving and executing the command includes:

means for determining whether the specified length of data is to be written to an address specified by the message coprocessor; and means for storing specified amount of data starting at the specified address.

12. The network interface of claim 11, wherein the means for storing further includes means for generating an interrupt signal to the host processor.

13. The network interface of claim 1, wherein the command indicates a specified length of data from the message to be written by the network interface, wherein the means from receiving and executing the command includes:

means for selecting a free buffer; and means for storing specified amount of data in the selected free buffer.

14. The network interface of claim 1, wherein the received message is a segmented message and wherein the means for receiving and executing a command includes means for automatically processing any next control segment in the segmented message after completing processing of any previous control segment.

15. A transmit side of a network interface for connecting a host computer having a processor and memory to a network, wherein the network connects the host computer to a plurality of computers to communicate messages among the computers, wherein the host computer and each of the plurality of computers has a separate memory and operating system, the transmit side of the network interface comprising:

means, in the network interface, for receiving source control information from the host computer, wherein the source control information indicates how destination control information is obtained for an outgoing message, and for communicating the source control information to a programmable message coprocessor connected to the network interface and separate from the operating system of the host computer; and means, in the network interface and operative after communication of source control information to the programmable message coprocessor, for receiving a command and arguments generated by the programmable message coprocessor in response to the source control information;

means for performing at least one of a small set of commands according to the received command and arguments to obtain the destination control information indicating an operation to be performed on the outgoing message by a recipient of the outgoing message while bypassing the operating system of the host computer; and means, in the network interface, for inserting the destination control information in the outgoing message to be transmitted over the network to at least one of the plurality of computers.

16. The network interface of claim 15, wherein the message coprocessor is external to the network interface, and wherein the network interface is an integrated circuit comprising a message controller implementing said means for receiving and for communicating, and having an interface to the external message co-processor.

17. The network interface of claim 16, wherein the interface in the network interface is a memory-mapped local bus connected to the external message coprocessor.

18. The network interface of claim 15, wherein the source control information is written to a designated memory location on a memory-mapped bus connecting the network interface to the message coprocessor.

19. The network interface of claim 15, wherein the command received from the message coprocessor has a format including a first field indicating one of a small set of operations to be performed by the network interface and a second field indicating one or more operands.

20. The network interface of claim 19, wherein the command is read from a designated memory location on a memory-mapped bus connecting the network interface to the message coprocessor.

21. The network interface of claim 19, wherein the command has a format including one separate bit for each possible operation to be performed by the network interface.

22. The network interface of claim 15, wherein the means for receiving and executing the command includes means, operative in response to command, for reading and sending more data from the host computer to the message coprocessor and for repeating, receiving and execution of a further command from the message coprocessor.

23. The network interface of claim 15, wherein the command indicates a specified amount of data to be read by the network interface, and wherein the means for receiving and executing the command includes:

means for determining whether the specified length of data is to be read from an address specified by the received command; and means for reading the specified amount of data in the specified buffer into the outgoing message.

24. The network interface of claim 15, wherein the command indicates a specified amount of data to be read by the network interface, wherein the means for receiving and executing the command includes:

means for selecting data from the buffers presented to the network interface by the host for transmission; and means for reading the specified amount of data from the selected buffer and inserting the data read into an outgoing message.

25. The network interface of claim 15, wherein the outgoing message is a segmented message and wherein the means for receiving and executing a command includes means for automatically processing any next control segment in the segmented message after completing processing of any previous control segment.

26. A network interface connected to a host computer having a processor and a memory, for transmitting and receiving messages to and from a network connecting the host computer to a plurality of computers, wherein the host computer and each of the plurality of computers has a separate memory and operating system, wherein a message contains destination control information indicating an operation to be performed and a header indicating a communication channel, the network interface comprising:

a controller and associated memory containing information on a location of destination control information in messages received and transmitted by the network interface;

an interface for connection to a programmable message coprocessor, including means for transmitting control information to the programmable message coprocessor from the controller and means for receiving one of a small set of commands from the programmable message coprocessor separate from the operating system of the host computer, wherein the controller has means for obtaining destination control information, indicating an operation to be performed at a destination of an outgoing message, in response to a command from the programmable message coprocessor and for inserting the destination control information into the outgoing message; and wherein the controller has means for handling received messages according to commands received from the programmable message coprocessor while bypassing the operating system of the host computer.

* * * * *